United States Patent
Cho et al.

(10) Patent No.: US 11,161,980 B2
(45) Date of Patent: Nov. 2, 2021

(54) COMPOSITION COMPRISING POLYMER AND INORGANIC PARTICLES, POLYIMIDE-INORGANIC PARTICLES COMPOSITE, ARTICLE INCLUDING THE COMPOSITE, AND OPTICAL DEVICE INCLUDING THE ARTICLE

(71) Applicant: Samsung Electronics Co., Ltd., Suwon-si (KR)

(72) Inventors: Won Joon Cho, Suwon-si (KR); Young Jae Kang, Suwon-si (KR); Hyun Seok Choi, Anyan -si (KR); Eun Sung Lee, Hwaseong-si (KR)

(73) Assignees: SAMSUNG ELECTRONICS CO., LTD., Gyeonggi-Do (KR); SAMSUNG DISPLAY CO., LTD., Gyeonggi-Do (KR)

( * ) Notice: Subject to any disclaimer, the term of this patent is extended or adjusted under 35 U.S.C. 154(b) by 291 days.

(21) Appl. No.: 16/510,369

(22) Filed: Jul. 12, 2019

(65) Prior Publication Data
US 2020/0017683 A1    Jan. 16, 2020

(30) Foreign Application Priority Data
Jul. 13, 2018    (KR) .................. 10-2018-0081628

(51) Int. Cl.
*C08L 79/08* (2006.01)
*C08K 5/52* (2006.01)
*C08K 3/22* (2006.01)
*C08L 77/06* (2006.01)

(52) U.S. Cl.
CPC ............... *C08L 79/08* (2013.01); *C08K 3/22* (2013.01); *C08K 5/52* (2013.01); *C08K 2003/2241* (2013.01); *C08K 2201/011* (2013.01); *C08L 77/06* (2013.01); *C08L 2203/16* (2013.01)

(58) Field of Classification Search
CPC .............. C08L 79/08; C08K 5/52; C08K 3/22
USPC .......................................................... 524/497
See application file for complete search history.

(56) References Cited

U.S. PATENT DOCUMENTS

| 2004/0235992 A1* | 11/2004 | Okada ................. C08F 290/048 524/115 |
|---|---|---|
| 2011/0151163 A1 | 6/2011 | Bloom et al. |
| 2017/0200919 A1 | 7/2017 | Luchinger et al. |

FOREIGN PATENT DOCUMENTS

| JP | 2008280403 A | 11/2008 |
|---|---|---|
| JP | 4813013 B2 | 9/2011 |
| JP | 201640348 A | 3/2016 |

* cited by examiner

*Primary Examiner* — Deve V Hall
(74) *Attorney, Agent, or Firm* — Cantor Colburn LLP

(57) ABSTRACT

A composition including a polymer including at least one of an amic acid structural unit and an imide structural unit, inorganic particles, and a compound represented by Chemical Formula 1, a polymer-inorganic particle composite prepared from the composition, an article, and an optical device including the article:

Chemical Formula 1

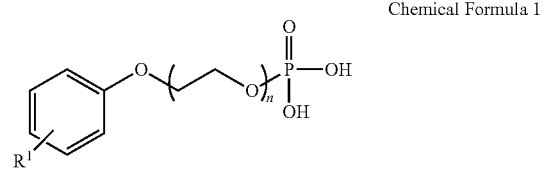

In Chemical Formula 1, $R^1$ is a linear or branched, substituted or unsubstituted C1 to C30 alkyl group, a substituted or unsubstituted C3 to C10 cycloalkyl group, a substituted or unsubstituted C6 to C30 aryl group, or a combination thereof, and n is an integer of 1 or more.

19 Claims, 21 Drawing Sheets

COMPOSITION COMPRISING POLYMER AND INORGANIC PARTICLES, POLYIMIDE-INORGANIC PARTICLES COMPOSITE, ARTICLE INCLUDING THE COMPOSITE, AND OPTICAL DEVICE INCLUDING THE ARTICLE

CROSS-REFERENCE TO RELATED APPLICATION

This application claims priority to and the benefit of Korean Patent Application No. 10-2018-0081628 filed in the Korean Intellectual Property Office on Jul. 13, 2018, and all the benefits accruing therefrom under 35 U.S.C. § 119, the content of which in its entirety are incorporated herein by reference.

BACKGROUND

1. Field

This disclosure relates to a composition including a polymer including an amic acid structural unit and/or an imide structural unit, and an inorganic particle, a polyimide-inorganic particle composite manufactured from the composition, an article including the composite, and an optical device including the article.

2. Description of the Related Art

A colorless transparent material has been researched for diverse purposes such as for an optical lens, a functional optical film, and a disk substrate, but as information devices are being further miniaturized and display devices are providing higher resolution, more functions and greater performance are required from the material. Therefore, it would be a particular advantage to develop a colorless transparent material having excellent transparency, heat resistance, mechanical strength, and flexibility.

SUMMARY

An embodiment provides a composition including a polymer and an inorganic particle capable of being mixed with the polymer uniformly.

Another embodiment provides a polyimide-inorganic particle composite manufactured from the composition and having improved optical properties, mechanical characteristics, and heat-resistance.

Yet another embodiment provides an article having improved optical properties, mechanical characteristics, and heat-resistance, and including the polyimide-inorganic particle composite.

Still another embodiment provides an optical device including the article.

An embodiment provides a composition including a polymer including an amic acid structural unit, an imide structural unit, or a combination thereof, inorganic particles, and a compound represented by Chemical Formula 1:

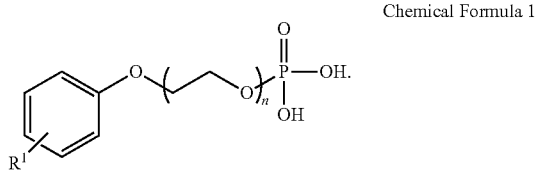

Chemical Formula 1

In Chemical Formula 1, $R^1$ is a linear or branched, substituted or unsubstituted C1 to C30 alkyl group, a substituted or unsubstituted C3 to C10 cycloalkyl group, a substituted or unsubstituted C6 to C30 aryl group, or a combination thereof, and n is an integer of 1 or more.

$R^1$ of Chemical Formula 1 may be a linear or branched C1 to C20 alkyl group.

n of Chemical Formula 1 may be an integer greater than or equal to 5 and less than or equal to 20.

The inorganic particle may be an oxide, a hydroxide, a carboxylate, or a nitride of Ti, Si, Al, Zr, Zn, Sn, B, Ce, Sr, Ca, Ba, In, or W, a graphene oxide, or a combination thereof.

The inorganic particle may be silica ($SiO_2$), alumina ($Al_2O_3$), titania ($TiO_2$), strontium titanate ($SrTiO_3$), zirconia ($ZrO_2$), zinc oxide (ZnO), indium tin oxide (ITO), strontium carbonate ($SrCO_3$), zirconium tungsten oxide ($ZrW_2O_8$), antimony-doped tin oxide, or graphene oxide.

The inorganic particles may be titania ($TiO_2$) nanorods.

The inorganic particles may have an average particle diameter of a longest particle diameter of less than or equal to 50 nm.

The inorganic particles may be present in the composition in an amount of less than or equal to about 50 parts relative to 100 parts by weight of the polymer.

The compound represented by Chemical Formula 1 may be present in the composition in an amount of less than 300 parts by weight relative to 100 parts by weight of the inorganic particles.

The composition may further include a solvent.

The amic acid structural unit may be represented by Chemical Formula 2, and the imide structural unit may be represented by Chemical Formula 3:

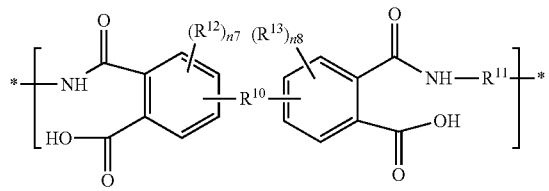

Chemical Formula 2

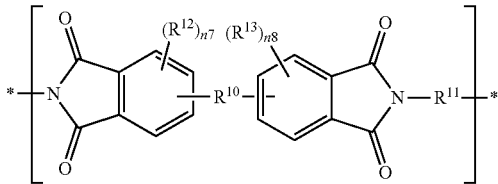

Chemical Formula 3

In Chemical Formula 2 and Chemical Formula 3, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C2 to C30 hetero cyclic group, or a combination thereof, $R^{11}$ is a substituted or unsubstituted C4 to C20 aliphatic cyclic group, or a substituted or unsubstituted C6 to C30 aromatic organic group, wherein the substituted or unsubstituted aromatic organic group is a single ring; a fused ring including two or more fused rings; or a ring system including two or more substituted or unsubstituted single or fused aromatic rings linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein, R$^{201}$ is a C1 to C10 aliphatic organic group), or —SiR$^{210}$R$^{211}$R$^{212}$ (wherein R$^{210}$, R$^{211}$ and R$^{212}$ are independently hydrogen or a C1 to C10 aliphatic organic group) group, and n7 and n8 are independently an integer from 0 to 3.

In Chemical Formula 2 and Chemical Formula 3, $R^{10}$ is a single bond, or a substituted or unsubstituted C1 to C30 aliphatic organic group, $R^{11}$ includes a substituted or unsubstituted C6 to C30 aromatic organic group, wherein the substituted or unsubstituted C6 to C30 aromatic organic group includes two or more single or fused aromatic rings that are linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 alkyl group, or a substituted or unsubstituted C6 to C20 aromatic organic group, and n7 and n8 are independently 0 or 1.

In Chemical Formula 2 or Chemical Formula 3, $R^{10}$ is a single bond, or a C1 to C10 alkylene group substituted with a haloalkyl group, $R^{11}$ is two substituted phenylene groups linked by a single bond, a fluorenylene group, a substituted or unsubstituted phenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C5 alkyl group, or a substituted or unsubstituted phenyl group, and n7 and n8 are independently 0 or 1.

Chemical Formula 2 may be represented by Chemical Formula 2-1, Chemical Formula 2-2, or a combination thereof, and Chemical Formula 3 may be represented by Chemical Formula 3-1, Chemical Formula 3-2, or a combination thereof:

Chemical Formula 2-1

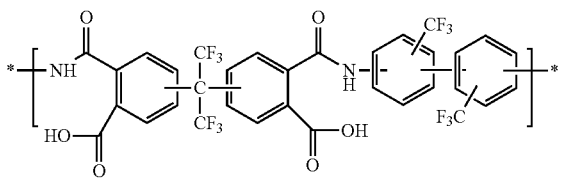

Chemical Formula 2-2

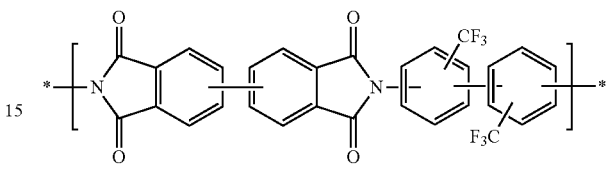

Chemical Formula 3-1

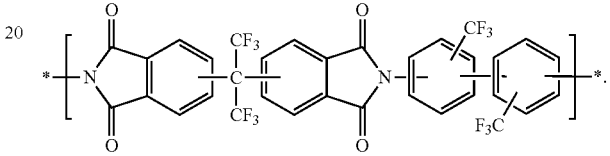

Chemical Formula 3-2

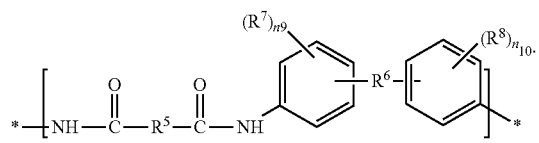

The polymer may further include an amide structural unit represented by Chemical Formula 4:

Chemical Formula 4

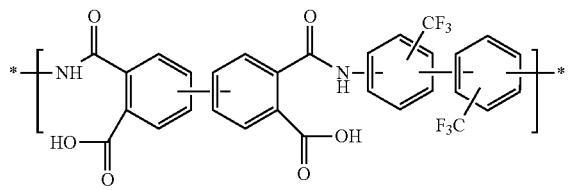

In Chemical Formula 4, $R^5$ is a substituted or unsubstituted C6 to C30 aromatic organic group, $R^6$ is a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^7$ and $R^8$ are independently a halogen, a hydroxy group, a substituted or unsubstituted C1 to C10 aliphatic organic group, a C6 to C20 aromatic organic group, —OR$^{200}$ (wherein R$^{200}$ is a C1 to C10 aliphatic organic group), or a silyl group (—SiR$^{201}$R$^{202}$R$^{203}$, wherein R$^{201}$, R$^{202}$, and R$^{203}$ are independently hydrogen, or a C1 to C10 aliphatic organic group), and n9 and n10 are independently an integer of 0 to 4.

Another embodiment provides a polyimide-inorganic particle composite manufactured from the composition according to an embodiment.

Yet another embodiment provides an article including the polyimide-inorganic particle composite according to the embodiment.

The article may be a film.

Still another embodiment provides an optical device including the article according to an embodiment.

The composition according to an embodiment includes inorganic particles wherein the surface of the inorganic particles is treated with a phosphate compound, so that the inorganic particles may be uniformly distributed in the composition without forming aggregates. Accordingly, an article manufactured by curing the composition including the polymer and the inorganic particles shows improved mechanical characteristics without deteriorating optical properties, and accordingly, when the composition is prepared into a film, excellent optical properties and mechanical properties may be obtained. Further, the article also shows improved heat-resistance, and thus, may advantageously be applied in a high-temperature process, and maintain good optical properties after being treated by a high temperature process. In addition, as the film prepared from the composition according to an embodiment has high transmittance and heat-resistance, good mechanical properties, as well as exhibits optical anisotropy, such as, in-plane retardation ($R_o$), it may be advantageously applied in various optical films, such as, a compensation film, and the like.

DETAILED DESCRIPTION

Figure 1:
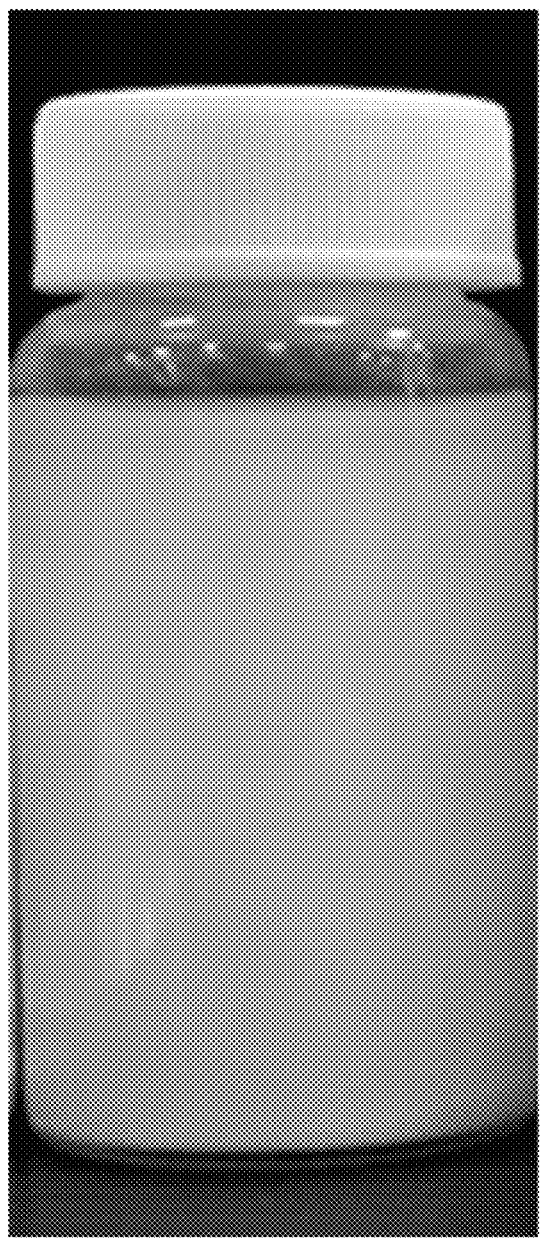
FIG. 1 is a photograph showing a dispersion including polyimide and commercially available titania particles (Ditto Technology Co., Ltd., South Korea) in an MIBK (methyl isobutyl ketone) solvent.

Hereinafter, embodiments are described in detail. However, these embodiments are exemplary, the present disclosure is not limited thereto, and the present disclosure is defined by the scope of claims. Rather, these embodiments are provided so that this disclosure will be thorough and complete, and will fully convey the scope of the invention to those skilled in the art.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a definition is not otherwise provided, "substituted" refers to replacement of at least one hydrogen of a functional group of the present disclosure by a substituent selected from a halogen atom (—F, —Cl, —Br, or —I), a hydroxy group, a nitro group, a cyano group, an amino group ((NH$_2$, NH(R$^{100}$) or N(R$^{101}$)(R$^{102}$), wherein R$^{100}$, R$^{101}$, and R$^{102}$ are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group or the substituents may be linked with each other to form a ring.

As used herein, when a specific definition is not otherwise provided, "aliphatic organic group" refers to saturated or unsaturated linear or branched hydrocarbon group, for example, a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group. As used herein when a specific definition is not otherwise provided, "alicyclic organic group" refers to a cyclic hydrocarbon having properties of an aliphatic group, e.g., a C3 to C30 cycloalkyl group, a C3 to C30 cycloalkenyl group, a C3 to C30 cycloalkynyl group, a C3 to C30 cycloalkylene group, a C3 to C30 cycloalkenylene group, or C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or C3 to C15 cycloalkynylene group. As used herein when a specific definition is not otherwise provided, "aromatic organic group" refers to an organic compound or group comprising at least one unsaturated cyclic group having delocalized pi electrons, for example, a C6 to C30 aryl group or a C6 to C30 arylene group, and specifically a C6 to C16 aryl group or a C6 to C16 arylene group. As used herein when a specific definition is not otherwise provided, "heterocyclic group" refers to a saturated or unsaturated cyclic group or compound wherein at least one carbon is replaced with a heteroatom (e.g., 1, 2, or 3) in the cyclic backbone, for example a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group that include 1 to 3 heteroatoms of O, S, N, P, Se, Si, or a combination thereof in one ring, and specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group that include 1 to 3 heteroatoms of O, S, N, P, Se, Si, or a combination thereof in one ring.

As used herein, "alkyl" refers to a linear or branched chain, saturated, monovalent hydrocarbon group; "alkylene" refers to a linear or branched chain, saturated, divalent hydrocarbon group; "alkenyl" refers to a linear or branched chain monovalent hydrocarbon group having at least one carbon-carbon double bond; "alkenylene" refers to a linear or branched chain divalent hydrocarbon group having at least one carbon-carbon double bond; "alkynyl" refers to a linear or branched chain monovalent hydrocarbon group having at least one carbon-carbon triple bond; "alkynylene" refers to a linear or branched chain divalent hydrocarbon group having at least one carbon-carbon triple bond; "cycloalkyl" refers to a non-aromatic monovalent monocyclic or polycyclic hydrocarbon group; "cycloalkylene" refers to a non-aromatic divalent monocyclic or polycyclic hydrocarbon group; "cycloalkenyl" refers to a non-aromatic cyclic monovalent hydrocarbon group having at least one carbon-carbon double bond; "cycloalkenylene" refers to a non-aromatic cyclic divalent hydrocarbon group having at least one carbon-carbon double bond; "aryl" refers to a monoaromatic or polyaromatic monovalent hydrocarbon group; "arylene" refers to a monoaromatic or polyaromatic divalent hydrocarbon group; "heterocycloalkyl" refers to a non-aromatic monovalent monocyclic or polycyclic group having at least one heteroatom (i.e., N, O, S, Si, Se, or P) in the monocyclic or polycyclic group; "heterocycloalkylene" refers to a non-aromatic divalent monocyclic or polycyclic group having at least one heteroatom (i.e., N, O, S, Si, Se, or P) in the monocyclic or polycyclic group; "heterocycloalkenyl" refers to a non-aromatic monovalent cyclic group having at least one carbon-carbon double bond and having at least one heteroatom (i.e., N, O, S, Si, Se, or P) in the monocyclic or polycyclic group; "heterocycloalkenylene" refers to a non-aromatic divalent cyclic group having at least one carbon-carbon double bond and having at least one heteroatom (i.e., N, O, S, Si, Se, or P) in the monocyclic or polycyclic group; "heterocycloalkynyl" refers to a non-aromatic monovalent cyclic group having at least one carbon-carbon triple bond and having at least one heteroatom (i.e., N, O, S, Si, Se, or P) in the monocyclic or polycyclic group; "heterocycloalkynylene" refers to a non-aromatic divalent cyclic group having at least one carbon-carbon triple bond and having at least one heteroatom (i.e., N, O, S, Si, Se, or P) in the monocyclic or polycyclic group; "heteroaryl" refers to a monoaromatic or polyaromatic monovalent group having at least one heteroatom (i.e., N, O, S, Si, Se, or P) in the monocyclic or polycyclic group; and "heteroarylene" refers to a monoaromatic or polyaromatic divalent group having at least one heteroatom (i.e., N, O, S, Si, Se, or P) in the monocyclic or polycyclic group.

As used herein, when specific definition is not otherwise provided, the term "combination" refers to mixing or copolymerization. Herein, "copolymerization" refers to random copolymerization, block copolymerization, or graft copolymerization.

As used herein, "*" indicates a point where the same or different atom or chemical formula is linked.

There has been an increasing demand for display devices that consume a small amount of power, that are lightweight and flexible, and that can be used anywhere and at any time. There is a need for a flexible display device having a flexible substrate that can be made from organic and inorganic materials using a low temperature process, having flexible electronics, and having improved sealing and packing technology.

Transparent plastic films applied as flexible display devices have replaced conventional window cover glass and require high hardness and optical properties. The hardness may be complemented by coating a hard coating layer thereon, but herein, a base film having a high tensile modulus (hereinafter "modulus") may contribute to increasing the hardness of a final film. The optical properties may include high light transmittance, a low haze, a low yellowness index (YI), UV coloring resistance characteristics, and the like.

In order to improve the mechanical properties of the transparent plastic film, a nanocomposite was prepared by mixing inorganic material nanoparticles with a polymer, such as, a polyimide, a polyamide, and the like. However, the inorganic material nanoparticles may not be uniformly mixed with the polymer, may be agglomerated, or may form an aggregate. The nanoparticle aggregates have a negative influence on optical properties of a film and the like formed from the nanocomposite including the same. To prevent agglomeration of the nanoparticles, the nanoparticles may be added in a small amount, for example, in an amount of about 5 wt % based on an amount of the polymer. However, when the nanoparticles are added in a small amount, the resulting film and the like shows insufficient improvement in mechanical properties, and when the amount of the nanoparticles is increased, optical properties (transmittance, YI, haze, and the like) are sharply deteriorated.

In an attempt to solve this problem, U.S. Pat. No. 9,365, 694 disclosed a composition including a polyimide or poly (imide-amide) copolymer wherein at least one terminal end of the copolymer was substituted with a siloxane or silanol group; and an inorganic oxide or inorganic hydroxide particle or a precursor thereof. The U.S. Patent discloses that the composition includes an inorganic oxide or an inorganic hydroxide particle in an amount greater than or equal to about 5 wt %, for example, in a range of about 5 wt % to about 95 wt % based on a total weight of a polymer. The siloxane or silanol group bound to a terminal end of the copolymer forms a chemical bond with the inorganic oxide or the inorganic hydroxide particle.

U.S. Patent Publication No. 2016-0096927 A1 disclosed a polyimide-inorganic particle nanocomposite, wherein the inorganic particles were bound or grafted to the polyimide through a chemical bond between the inorganic particles and the polyimide main chains. Such nanocomposites were prepared by in-situ polymerization of the monomers for forming the polyimide in the presence of the inorganic particles having an amino group on their surfaces. The polyimide-inorganic particle nanocomposite disclosed in this U.S. Patent Publication includes the inorganic particles in an amount of less than or equal to about 2 volume % based on a total volume of the prepared polyimide (solid content), or less than or equal to about 5 weight % based on a total weight of the prepared polyimide (solid content), and accordingly, the polymer-inorganic particle nanocomposite includes the inorganic particles in a small amount as described above.

The present inventors hereof have developed a composition for a polymer-inorganic particle nanocomposite including a large amount of inorganic particles and having improved mechanical properties without deteriorating the optical properties. The inorganic particles are uniformly dispersed in a polymer matrix and form no aggregate, even when the inorganic particles are included in an amount of greater than or equal to about 5 wt %, for example, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, greater than or equal to about 40 wt %, greater than or equal to about 45 wt %, or greater than or equal to about 50 wt % based on a weight of a polymer, provided that the surface of the inorganic particles are treated with a phosphate compound having a polyethylene glycol group to prevent agglomeration of the inorganic particles in the composition and uniformly disperse them in the polymer. The film prepared from the composition may have improved mechanical and optical properties, as well as increased in-plane retardation ($R_o$). Herein, the polymer may be any polymer, but a polyimide or poly(imide-amide) copolymer is particularly suitable for an optical film having high heat resistance, excellent optical properties, and improved mechanical properties in an exemplary embodiment.

Accordingly, an embodiment provides a composition including a polymer including an amic acid structural unit, an imide structural unit, or a combination thereof, inorganic particles, and a compound represented by Chemical Formula 1:

Chemical Formula 1

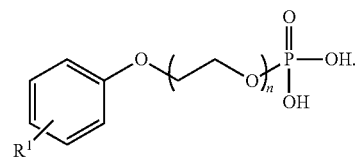

In Chemical Formula 1, $R^1$ is a linear or branched, substituted or unsubstituted C1 to C30 alkyl group, a substituted or unsubstituted C3 to C10 cycloalkyl group, a substituted or unsubstituted C6 to C30 aryl group, or a combination thereof, and n is an integer of 1 or more.

$R^1$ of Chemical Formula 1 may be a linear or branched C1 to C20 alkyl group, for example, a linear or branched C3 to C20 alkyl group, for example, a linear or branched C5 to C20 alkyl group, for example, a linear or branched C7 to C20 alkyl group, for example, a linear or branched C8 to C20 alkyl group, for example, a linear or branched C8 to C18 alkyl group, for example, a linear or branched C8 to C16 alkyl group, for example, a linear or branched C8 to C14 alkyl group, for example, a linear or branched C8 to C12 alkyl group, or for example, a linear or branched C8 to C10 alkyl group, but is not limited thereto.

In an exemplary embodiment, $R^1$ of Chemical Formula 1 may be 1,1-dimethyl-3,3-dimethyl butyl group.

n of Chemical Formula 1 may be an integer greater than or equal to 5 and less than or equal to 20, for example, an integer greater than or equal to 7 and less than or equal to 20, for example, an integer greater than or equal to 10 and less than or equal to 18, for example, an integer greater than or equal to 10 and less than or equal to 15, for example, an integer greater than or equal to 10 and less than or equal to 13, or for example, an integer of 11 or 12. By appropriately selecting the n, it is possible to determine the size and/or the molecular weight of the compound represented by Chemical Formula 1, which a person skilled in the art could appropriately determine considering type of the polymer included in the composition, and/or the functional group linked to the polymer.

In an exemplary embodiment, the compound represented by Chemical Formula 1 may be represented by Chemical Formula 5:

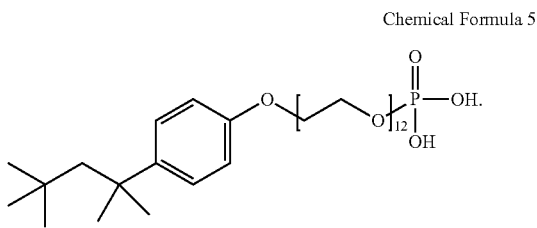

Chemical Formula 5

In the technology area of mixing inorganic particles with a polymer to prepare a polymer-inorganic particle nanocomposite, a method of surface-treating inorganic particles with a silane coupling agent, such as, 3-aminopropyl-trimethoxysilane (APS), 3-aminopropyl-triethoxysilane, or 3-aminophenyl-trimethoxysilane, and the like, is known. As for a composition including the inorganic particles wherein a surface of the inorganic particle is treated with silane coupling agents, the inorganic particles are known to form aggregates and not be uniformly dispersed in the composition. However, the inorganic particles included in the composition according to an embodiment do not aggregate but are uniformly dispersed in the composition as the inorganic particles are present along with the compound represented by Chemical Formula 1, which has a phosphate group at an end and a phenoxy group that is substituted with any one of an alkyl group, a cycloalkyl group, and an aryl group at the other end thereof via at least one ethylene oxide group therebetween.

Figure 2:
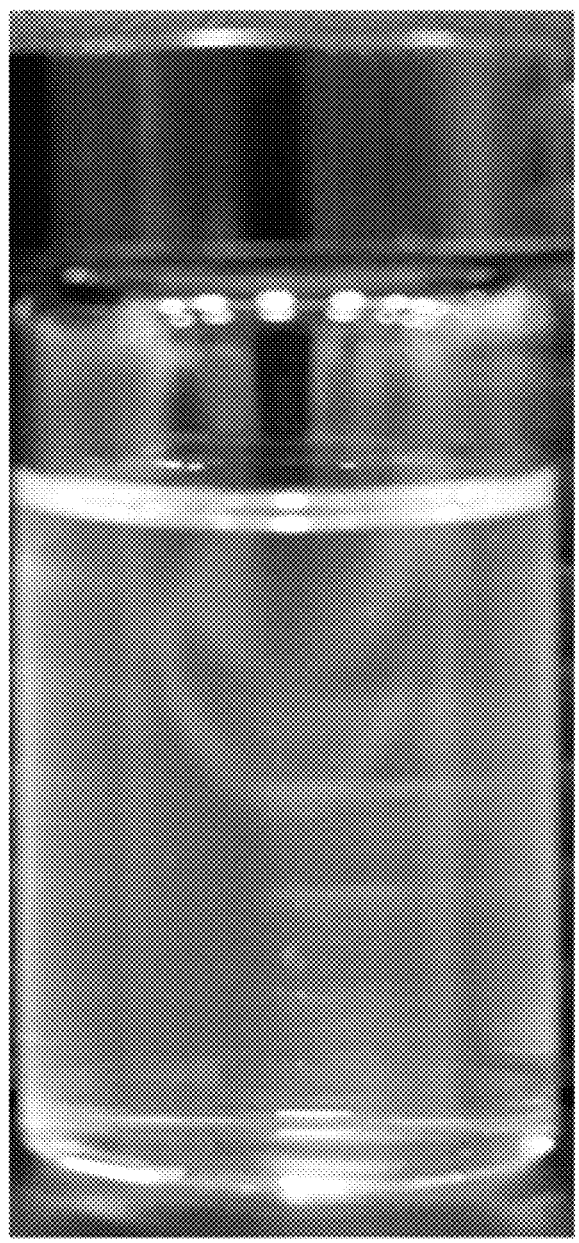
FIG. 2 is a photograph showing a dispersion including polyimide and titania particles in an MIBK (methyl isobutyl ketone) solvent, wherein a surface of the titania particles is treated with the compound represented by Chemical Formula 5 (TX102-P).
Figure 3:
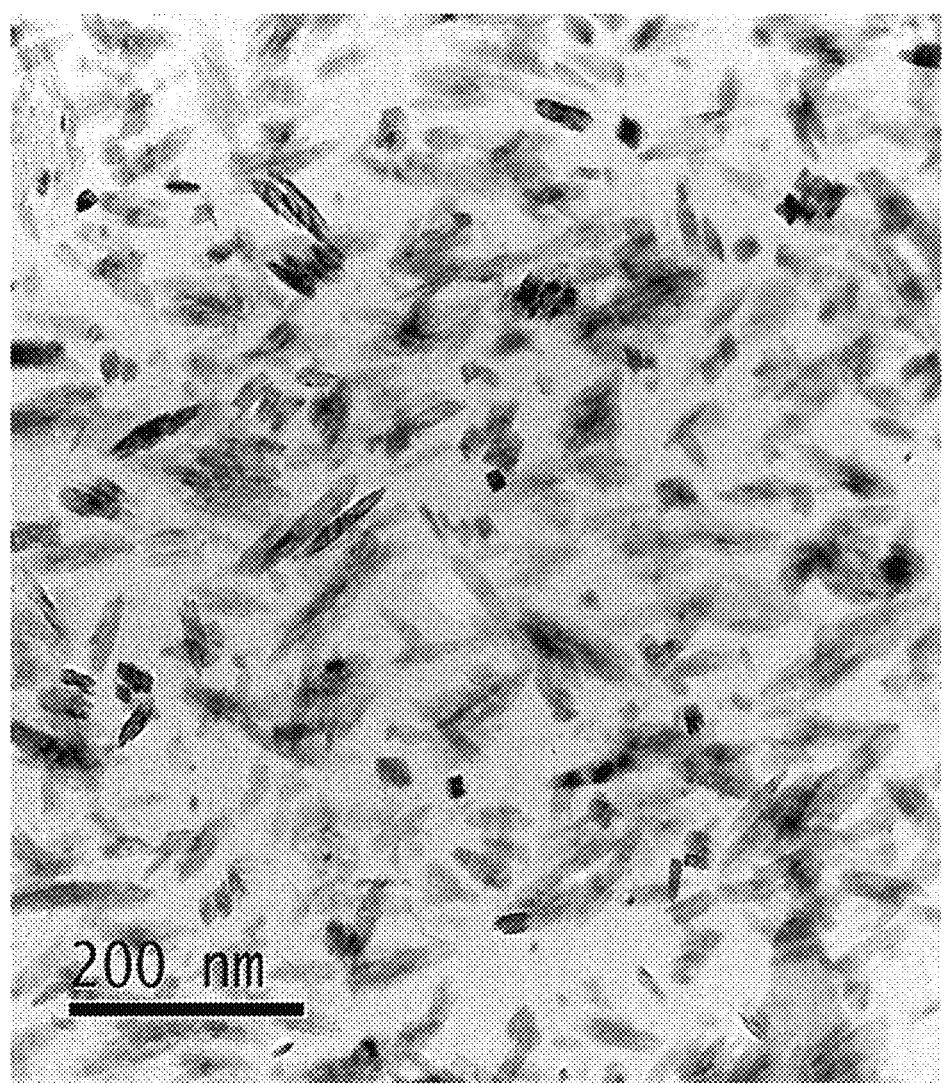
FIG. 3 is a TEM (transmission electron microscopy) photograph showing a cross-section of a film prepared from the dispersion shown in FIG. 1.
Figure 4:
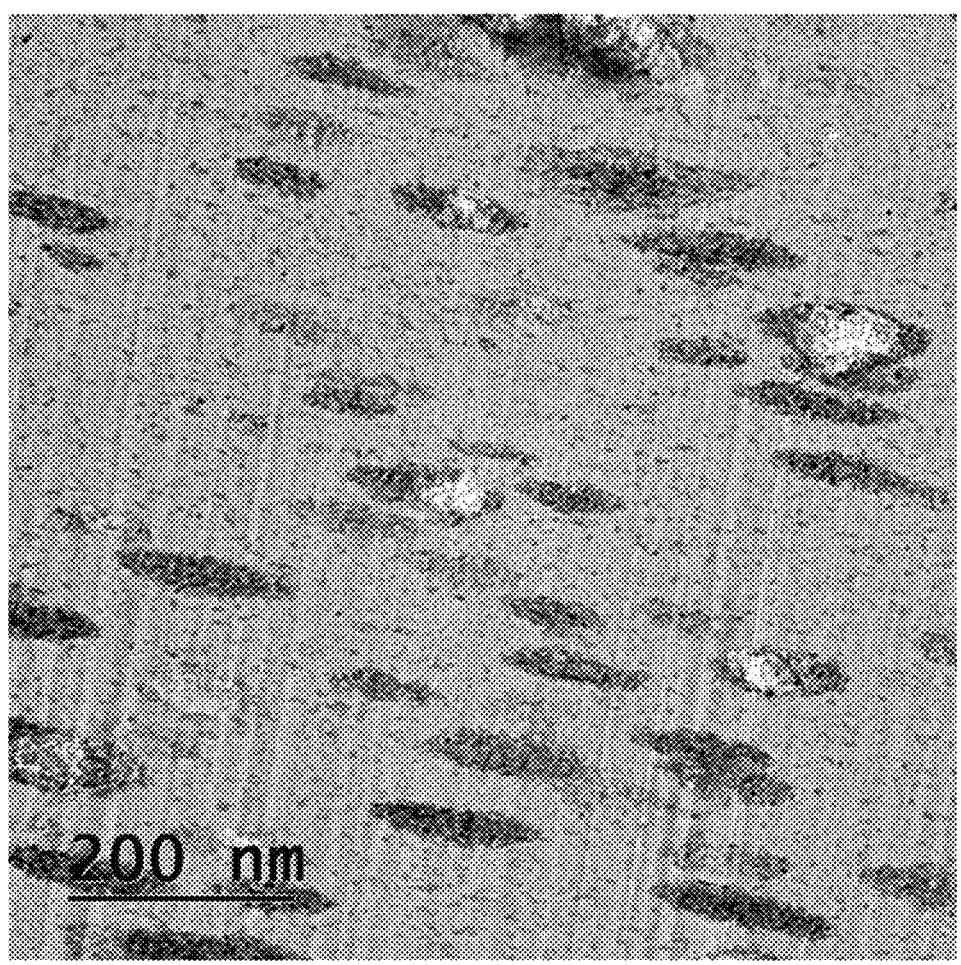
FIG. 4 is a TEM photograph showing a cross-section of a film prepared from the dispersion shown in FIG. 2.

As shown in FIG. 1, a solution including 15 parts by weight of commercially available $TiO_2$ particles (Ditto Technology, Ltd., South Korea) based on 100 parts by weight of polyimide, which is present in a concentration of 18 wt % in MIBK appears cloudy upon visual examination. On the contrary, as shown in FIG. 2, a solution including the same amount of $TiO_2$ particles and polyimide as in FIG. 1, but also including the compound represented by Chemical Formula 1 in an amount of 250 parts by weight based on 100 parts by weight of the $TiO_2$ particles, appears transparent upon visual examination. Further, FIGS. 3 and 4 show TEM photographs of the cross-sections of the films respectively formed from the solutions of FIGS. 1 and 2. FIG. 3 shows that the $TiO_2$ particles form irregular aggregates having various diameters of from about nm to about 200 nm throughout the film, but FIG. 4 shows a small amount of aggregates having relatively uniform size of diameters of less than about 200 nm and being relatively uniformly dispersed throughout the film.

In this way, the composition including inorganic particles and a polymer, along with the compound represented by Chemical Formula 1, may have improved mechanical properties without deteriorating the optical properties and increased heat-resistance of an article, such as, a film, and the like, formed therefrom, as the inorganic particles do not aggregate but uniformly disperse in a composition, as shown in the Examples that will be described later. Further, an article, such as, for example, a film, prepared from the composition including the compound represented by Chemical Formula 1, may exhibit an in-plane retardation ($R_o$), and thus be advantageously applied in a compensation film and the like requiring optical anisotropy. In addition, as the composition has an increased heat-resistance, it may be easily fabricated into a film by using a solution process, such as coating etc., and the film prepared therefrom may have excellent optical and mechanical properties, heat-resistance, and optical anisotropy.

The inorganic particle may be any optically transparent material. For example, the inorganic particle may be an oxide, a hydroxide, a carboxylate, or a nitride of Ti, Si, Al, Zr, Zn, Sn, B, Ce, Sr, Ca, Ba, In, or W, a graphene oxide, or a combination thereof, but is not limited thereto. For example, the inorganic particle may be silica ($SiO_2$), alumina ($Al_2O_3$), titania ($TiO_2$), strontium titanate ($SrTiO_3$), zirconia ($ZrO_2$), zinc oxide (ZnO), indium tin oxide (ITO), strontium carbonate ($SrCO_3$), zirconium tungsten oxide ($ZrW_2O_8$), antimony-doped tin oxide, graphene oxide, or a combination thereof, but is not limited thereto.

The inorganic particle may have a spherical shape or a nonspherical shape, such as, for example, a rod shape, or a fiber shape. Accordingly, the aspect ratio of the inorganic particle may range from about 1 to about 100, for example, about 1 to about 80, about 1 to about 50, about 1 to about 30, or about 1 to about 10, but is not limited thereto.

When the particle has an aspect ratio of 1 or greater, the average particle diameter of the longest particle diameter may be less than or equal to about 50 nm, for example, less than or equal to about 45 nm, for example, less than or equal to about 40 nm, for example, less than or equal to about 35 nm, for example, less than or equal to about 33 nm, or for example, less than or equal to about 30 nm. When the average particle diameter of the longest particle diameter is within the above range, a composition including the inorganic particles may have improved mechanical properties and heat-resistance, as well as exhibit in-plane retardation ($R_o$), with minimized deterioration of the optical properties, such as, for example, transmittance, YI, and the like. In an exemplary embodiment, the average particle diameter of the longest particle diameter may be from about 10 nm to about 40 nm, for example, from about 15 nm to about 40 nm, for example, from about 20 nm to about 40 nm, for example, from about 20 nm to about 35 nm, or for example, from about 20 nm to about 30 nm, but is not limited thereto.

The inorganic particle may be present in the composition in an amount of less than or equal to about 50 parts by weight, for example, less than or equal to about 45 parts by weight, less than or equal to about 40 parts by weight, less than or equal to about 35 parts by weight, less than or equal to about 30 parts by weight, less than or equal to about 25 parts by weight, or less than or equal to about 20 parts by weight, or in an exemplary embodiment, about 5 parts by weight to about 50 parts by weight, for example, about 10 parts by weight to about 50 parts by weight, about 15 parts by weight to about 50 parts by weight, about 15 parts by weight to about 45 parts by weight, about 20 parts by weight to about 45 parts by weight, about 22 parts by weight to about parts by weight, about 25 parts by weight to about 45 parts by weight, about parts by weight to about 40 parts by weight, about 25 parts by weight to about 35 parts by weight, or about 25 parts by weight to about 30 parts by weight based on 100 parts by weight of the polymer, but is not limited thereto.

Advantageously, even at higher amounts of the inorganic particles relative to the content of the polymer, the composition appears transparent in a solution state, and a film prepared therefrom does not include agglomerates of the inorganic particles. As a result, the film prepared from the composition exhibits excellent optical and mechanical properties, as well as in-plane retardation ($R_o$).

The inorganic particles may be present in an amount of less than or equal to about 20 parts by volume, for example, less than or equal to about 15 parts by volume, less than or equal to about 10 parts by volume, for example, from about 1 parts by volume to about 20 parts by volume, for example, from about 3 parts by volume to about 20 parts by volume, for example, from about 5 parts by volume to about 20 parts by volume, for example, from about 5 parts by volume to about 15 parts by volume, or for example, from about 5 parts by volume to about 10 parts by volume, based on 100 parts by volume of the polymer.

As the density of most inorganic particles is known, when the inorganic particles are used by either a part by volume or a part by mass (a part by weight), a person having an ordinary skill in a related art may easily calculate the other unit from the given unit. Accordingly, even though the inorganic particles are used by either a part by volume or a part by mass, the inorganic particles may be regarded to be included in a substantially equivalent amount.

In an exemplary embodiment, the inorganic particle may be titania ($TiO_2$), for example, a titania nanorod. An aspect ratio of the titania nanorod may range from about 1 to about 50, for example, about 1.5 to about 50, about 1.5 to about 40, about 2 to about 30, about 3 to about 30, about 5 to about 30, about 5 to about 20, about 10 to about 30, about 10 to about 25, or about 10 to about 20.

An average particle diameter of the longest particle diameter of the titania nanorod may be less than or equal to about 50 nm, for examples, less than or equal to about 45 nm, for example, less than or equal to about 40 nm, for example, less than or equal to about 35 nm, for example, less than or equal to about 30 nm, or for example, from about 10 nm to about 40 nm, for example, from about 15 nm to about 40 nm, from about 20 nm to about 40 nm, from about 20 nm to about 35 nm, or for example, from about 20 nm to about 30 nm, but is not limited thereto.

Advantageously, the titania nanoparticle is an inorganic particle having a high transparency. The titania nanorod may be synthesized by using titanium isopropoxide, a precursor of titania, along with a surfactant in an organic solvent, using a solvent-heating synthesis method, and the surface of the titania nanorod may be coated with the surfactant used in the synthesis, for example, a material, such as oleic acid. This titania-nanorod is relatively well dispersed in an organic solvent having a low polarity, for example, a solvent such as toluene, but is not well dispersed in a solvent having a high polarity, such as DMAc (N,N-dimethyl acetamide) or MIBK and precipitates. As a polymer, such as, for example, a polyimide or a polyamide, is dissolved in an organic polar solvent, such as, for example, DMAc, the titania nanorod should also be well dispersed in the organic polar solvent in order to form a composite with the polymer. In an embodiment, the composition includes inorganic particles along with the compound represented by Chemical Formula 1, wherein a surface of the inorganic particles is covered by the compound represented by Chemical Formula 1, whereby the inorganic particles do not aggregate, but are uniformly dispersed even in a polar solvent. The firstly prepared titania nanorod coated with a surfactant, such as, for example, oleic acid, may further be reacted with a compound represented by Chemical Formula 1 in a solvent to prepare a titania nanorod of which a surface is adsorbed with the compound represented by Chemical Formula 1, which replaces the oleic acid. Thus obtained titania nanorod, unlike the nanorod coated with a surfactant, such as, for example, oleic acid, does not precipitate in a polar solvent, such as, for example, DMAc, MIBK, and the like, and renders the dispersion transparent, and, even though a polymer, such as polyimide or polyamic acid, is added thereto, may maintain a uniform dispersion, and therefore, realize a composition according to an embodiment. Without being bound by a specific theory, this phenomenon occurs because the compound represented by Chemical Formula 1 includes an ethylene oxide unit, and thus makes the surface of titania hydrophilic. In other words, the titania includes a plurality of hydrophilic groups, such as, for example, ethylene oxide, and thus is regarded as being well dispersed even in a polar solvent such as DMAc. In this regard, the compound represented by Chemical Formula 1 may be referred to as "a dispersant" in the Examples later described for convenience.

The compound represented by Chemical Formula 1 may be present in an amount of less than 300 parts by weight based on 100 parts by weight of the inorganic particles in the composition according to an embodiment. For example, the compound represented by Chemical Formula 1 may be present in an amount of less than or equal to 290 parts by weight, for example, less than or equal to 285 parts by weight, for example, less than or equal to 280 parts by weight, for example, less than or equal to 275 parts by weight, for example, less than or equal to 270 parts by weight, for example, less than or equal to 265 parts by weight, for example, less than or equal to 260 parts by weight, for example, less than or equal to 255 parts by weight, for example, less than or equal to 250 parts by weight, for example, less than or equal to 230 parts by weight, for example, less than or equal to 220 parts by weight, for example, or less than or equal to 200 parts by weight based on 100 parts by weight of the inorganic particles in the composition according to an embodiment. In an exemplary embodiment, the compound represented by Chemical Formula 1 may be included in an amount of from 100 parts by weight to 300 parts by weight, for example, from 150 parts by weight to 300 parts by weight, for example, from 200 parts by weight to 300 parts by weight, for example, from 220 parts by weight to 300 parts by weight, for example, from 240 parts by weight to 300 parts by weight, for example, or from 250 parts by weight to 300 parts by weight based on 100 parts by weight of the inorganic particles in the composition according to an embodiment. By including the compound represented by Chemical Formula 1 within the above range, an article, such as, for example, a film, prepared from the composition may maintain good optical properties, as well as exhibit in-plane retardation ($R_o$).

In an exemplary embodiment, the amic acid structural unit may be represented by Chemical Formula 2, and the imide structural unit may be represented by Chemical Formula 3:

Chemical Formula 2

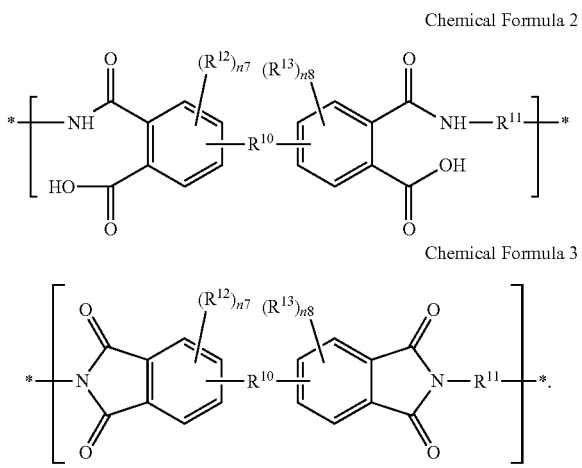

Chemical Formula 3

In Chemical Formula 2 and Chemical Formula 3, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C2 to C30 heterocyclic group, or a combination thereof, $R^{11}$ is a substituted or unsubstituted C4 to C20 aliphatic cyclic group, or a substituted or unsubstituted C6 to C30 aromatic organic group, wherein the substituted or unsubstituted aromatic organic group is a single ring; a fused ring including two or more aromatic rings; or a ring system including two or more substituted or unsubstituted single or fused aromatic rings linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein, R$^{201}$ is a C1 to C10 aliphatic organic group), a —SiR$^{210}$R$^{211}$R$^{212}$ (wherein R$^{210}$, R$^{211}$, and R$^{212}$ are independently hydrogen or a C1 to C10 aliphatic organic group) group, and n7 and n8 are independently an integer of 0 to 3.

The Chemical Formula 2 may be a structural unit of polyamic acid and the Chemical Formula 3 may be a structural unit of polyimide, and thus Chemical Formula 2 may be a structural unit of a precursor of Chemical Formula 3.

The composition according to an embodiment may include either one of polyamic acid including a structural unit represented by Chemical Formula 2, or polyimide including a structural unit represented by Chemical Formula 3, as a polymer, or a poly(amic acid-imide) including both of the polyamic acid structural unit represented by Chemical Formula 2 and the polyimide structural unit represented by Chemical Formula 3 in a polymer main chain.

In general, poly(amic acid) is prepared by reacting a tetracarboxylic acid dianhydride and a diamine to polymerize, and then, the prepared poly(amic acid) is treated with heat or a chemical imidizing agent, if necessary, to imidize a part or a whole of the amic acid structural units to form a poly(amic acid-imide) or polyimide. The composition according to an embodiment includes an inorganic particle, wherein a surface of the inorganic particle is treated with the compound represented by Chemical Formula 1, along with a polyamic acid, a poly(amic acid-imide), polyimide, or a combination thereof.

In an exemplary embodiment, the composition may further include a solvent used for preparation of a polyamic acid, a poly(amic acid-imide), or a polyimide. The solvent may be an aprotic polar organic solvent, for example, a sulfoxide-based solvent such as dimethyl sulfoxide, diethyl sulfoxide, and the like, a formamide-based solvent such as N,N-dimethyl formamide, N,N-diethyl formamide, and the like, an acetamide-based solvent such as N,N-dimethylacetamide, N,N-diethylacetamide, and the like, a pyrrolidone-based solvent such as N-methyl-2-pyrrolidone, N-vinyl-2-pyrrolidone, and the like, a phenol-based solvent such as phenol, o-, m- or p-cresol, xylenol, halogenated phenol, catechol, and the like, or hexamethylphosphoramide, γ-butyrolactone, and the like. These may be used alone or as a mixture. However, this is not limited thereto, and an aromatic hydrocarbon, such as, for example, xylene, toluene, or the like, may be used. In addition, in order to promote dissolution of the polymer, an alkali metal salt or alkaline earth metal salt may be further added to the solvent in an amount of less than or equal to about 50 wt % based on a total amount of the solvent. The solvent may be DMAc and/or MIBK, but is not limited thereto.

In Chemical Formula 2 or Chemical Formula 3, $R^{10}$ may be a single bond, or a substituted or unsubstituted C1 to C30 aliphatic organic group, $R^{11}$ may be a substituted or unsubstituted C6 to C30 aromatic organic group, wherein the substituted or unsubstituted C6 to C30 aromatic organic group includes two or more substituted or unsubstituted aromatic rings that are linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, wherein $R^{12}$ and $R^{13}$ are independently a halogen, a hydroxy group, a substituted or unsubstituted C1 to C10 alkyl group, or a substituted or unsubstituted C6 to C20 aromatic organic group, and n7 and n8 are independently 0 or 1.

In an exemplary embodiment, $R^{10}$ of Chemical Formula 2 or Chemical Formula 3 may be a single bond, or a C1 to C10 alkylene group substituted with a haloalkyl group, $R^{11}$ may be two substituted or unsubstituted phenylene groups linked by a single bond, a fluorenylene group, a substituted or unsubstituted phenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, and $R^{12}$ and $R^{13}$ may independently be a halogen, a hydroxy group, a substituted or unsubstituted C1 to C5 alkyl group, or a substituted or unsubstituted phenyl group, and n7 and n8 may independently be 0 or 1.

In an exemplary embodiment, $R^{10}$ of Chemical Formula 2 or Chemical Formula 3 may be a single bond, or a haloalkyl group, for example, a methylene group substituted with a —CF$_3$ group, $R^{11}$ may be biphenyl group, wherein each phenyl group of the biphenyl group is substituted with a —CF$_3$ group, and n7 and n8 may be 0.

In an exemplary embodiment, Chemical Formula 2 may be represented by Chemical Formula 2-1, Chemical Formula 2-2, or a combination thereof, and Chemical Formula 3 may be represented by Chemical Formula 3-1, Chemical Formula 3-2, or a combination thereof:

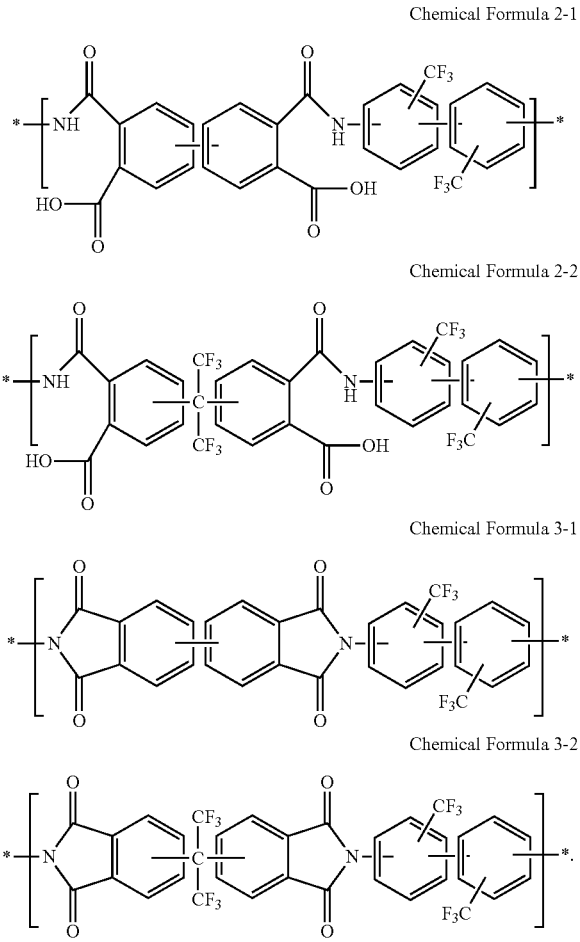

Chemical Formula 2-1

Chemical Formula 2-2

Chemical Formula 3-1

Chemical Formula 3-2

The polyamic acid, polyimide, or poly(amic acid-imide) including one of Chemical Formula 2-1 to Chemical Formula 3-2 or a combination thereof may have excellent optical properties and high heat resistance and improved mechanical properties.

The polyamic acid, polyimide, or poly(amic acid-imide) according to an exemplary embodiment may be prepared by reacting a tetracarboxylic acid dianhydride with a diamine in an aprotic polar organic solvent using a polyimide preparation method known to a person of ordinary skill in the art. The aprotic polar organic solvent is the same as previously described.

The tetracarboxylic dianhydride used for preparation of the polyamic acid, polyimide, or poly(amic acid-imide) may be 2,2-bis-(3,4-dicarboxylphenyl)hexafluoropropane dianhydride (6FDA), 3,3',4,4'-biphenyltetracarboxylic dianhydride (BPDA), benzophenone tetracarboxylic dianhydride (BTDA), bis(3,4-dicarboxylphenyl)sulfone dianhydride, or a combination thereof, but is not limited thereto.

The diamine used for preparation of the polyamic acid, polyimide, or poly(amic acid-imide) may be, for example, 2,2'-bis(trifluoromethyl)benzidine (TFDB), 4,4'-diaminodiphenyl sulfone (DADPS), 4,4'-(9-fluorenylidene)dianiline (BAPF), bis(4-(4-aminophenoxy)phenyl) sulfone (BAPS), 2,2',5,5'-tetrachlorobenzidine, 2,7-diaminofluorene, 1,1-bis(4-aminophenyl)cyclohexane, 4,4'-methylene bis-(2-methylcyclohexylamine), 4,4-diaminooctafluorobiphenyl, 3,3'-dihydroxybenzidine, 1,3-cyclohexanediamine, or a combination thereof, but is not limited thereto.

The types and amounts of the tetracarboxylic dianhydride and the diamine may be appropriately selected according to desirable compositions of the polyamic acid, polyimide, or poly(amic acid-imide).

In an exemplary embodiment, the polymer may further include an amide structural unit represented by Chemical Formula 4:

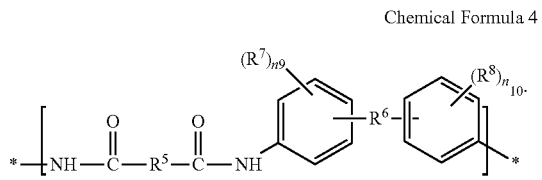

Chemical Formula 4

In Chemical Formula 4, $R^5$ is a substituted or unsubstituted C6 to C30 aromatic organic group, $R^6$ is a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^7$ and $R^8$ are independently a halogen, a hydroxy group, a substituted or unsubstituted C1 to C10 aliphatic organic group, C6 to C20 aromatic organic group, —OR$^{200}$ (wherein R$^{200}$ is a C1 to C10 aliphatic organic group), or a silyl group (—SiR$^{201}$R$^{202}$R$^{203}$, wherein R$^{201}$, R$^{202}$, and R$^{203}$ are independently hydrogen, or a C1 to C10 aliphatic organic group), and n9 and n10 are independently an integer of 0 to 4.

When the polymer further includes the amide structural unit represented by Chemical Formula 4, the polymer may form a poly(imide-amide). When the polymer further includes the amide structural unit represented by Chemical Formula 4, mechanical properties may be further improved.

The amide structural unit represented by Chemical Formula 4 may be prepared in a polyamide preparation method which is known in a related art, and for example, when a low temperature solution polymerization method is used, the amide structural unit represented by Chemical Formula 4 may be prepared by polymerizing carboxylic acid dichloride and diamine in an aprotic polar solvent. Herein, the diamine used to form the amide structural unit may be the same as used to form the imide structural unit or amic acid structural unit, and the carboxylic acid dichloride may be an aromatic carboxylic acid dichloride, for example, TPCl (terephthalic acid dichloride), BPCl (biphenylene dicarboxylic acid dichloride), and the like but is not limited thereto. In an exemplary embodiment, TFDB may be used as the diamine for forming the amide structural unit, and TPCl and/or BPCl may be used as the carboxylic acid dichloride.

The composition according to an embodiment may be coated on a substrate and the like, and then, cured after evaporating a solvent therefrom, and thus is manufactured into an article, such as a film, and the like. The article includes the inorganic particles, and thus may have remarkably improved mechanical properties, while maintaining excellent optical properties of a film formed from a polyimide or poly(imide-amide) copolymer including no inorganic particles, as well as exhibit optical anisotropy, such as, for example, in-plane retardation ($R_o$). Accordingly, the composition according to an embodiment may be fabricated to a compensation film and the like having in-plane retardation ($R_o$) by a simple solution process, as well as good heat-resistance.

As shown from lately described Examples, a composite film formed from a composition including a polyimide, from 19 parts by weight to 40 parts by weight of titania nanorod based on 100 parts by weight of the polyimide, and from 75 parts by weight to 250 parts by weight of the compound represented by Chemical Formula 1 based on 100 parts by weight of the titania nanorod shows excellent optical properties, such as an average transmittance of 89% or more at a wavelength region of 360 nm to 700 nm (i.e. total transmittance), a yellowness index (YI) of 1.3 or less, and a haze of less than 1%. Especially, when the compound represented by Chemical Formula 1 is included in an amount of 200 parts by weight or more based on 100 parts by weight of the titania nanorod, in-plane retardation ($R_o$) is exhibited. That is, by including inorganic particles in a large quantity, such as from about 19 parts by weight to parts by weight of the titania nanorods based on 100 parts by weight of the polyimide, the composite film has increased mechanical strength, while the optical properties are not deteriorated compared with a polyimide film that does not include inorganic particles. In addition, it is a surprising effect that the film exhibits optical anisotropy by including the compound represented by Chemical Formula 1.

On the contrary, a film formed from a composition including a polyimide and titania that is not capped with any material or coated by conventional surfactant, such as, for example, oleic acid, without the compound represented by Chemical Formula 1, shows drastically deteriorated optical properties, such as, a total transmittance of 79.3%, an increased yellowness index of 9.1, and increased haze of 85.5%, which is the degree at which the film cannot be used as an optical film. Further, although specific experimental data are not described in the specification, according to the experiments performed by the inventors, the film has drastically deteriorated mechanical characteristics, such as a Martens hardness of 45.0 N/mm², and a modulus of 3.3 GPa, which is much worse than a control film that does not include inorganic particles at all.

Consequently, when the composite film is formed from a composition including a polyimide and inorganic particles, which are not treated at all or treated with merely a conventional surfactant, without the compound represented by Chemical Formula 1, both the optical and mechanical properties may be deteriorated, and particularly, as the optical properties are drastically deteriorated, the film may not be suitable as an optical film. On the contrary, the polymer-inorganic particle composite including a large amount of inorganic particles along with the compound represented by Chemical Formula 1 according to an embodiment does not show deterioration in optical properties, while mechanical characteristics are improved in proportion to the amount of the inorganic particles, as well as optical anisotropy, such as in-plane retardation ($R_o$), is realized, which is not realized without the compound represented by Chemical Formula 1.

Therefore, the composition according to an embodiment, or an article formed therefrom, such as, a film, and the like, may be suitable as a window film and the like requiring excellent optical and mechanical properties, and in addition, may be applicable to various devices, such as, for example, lenses requiring a high refractive index, a polymeric birefringence film, and the like. Hereinafter, the embodiments are described with reference to examples.

The following examples are exemplary but do not limit the scope of the present disclosure.

EXAMPLES

Synthesis Example 1: Synthesis of Phosphate Compound Represented by Chemical Formula 5

Figure 10:
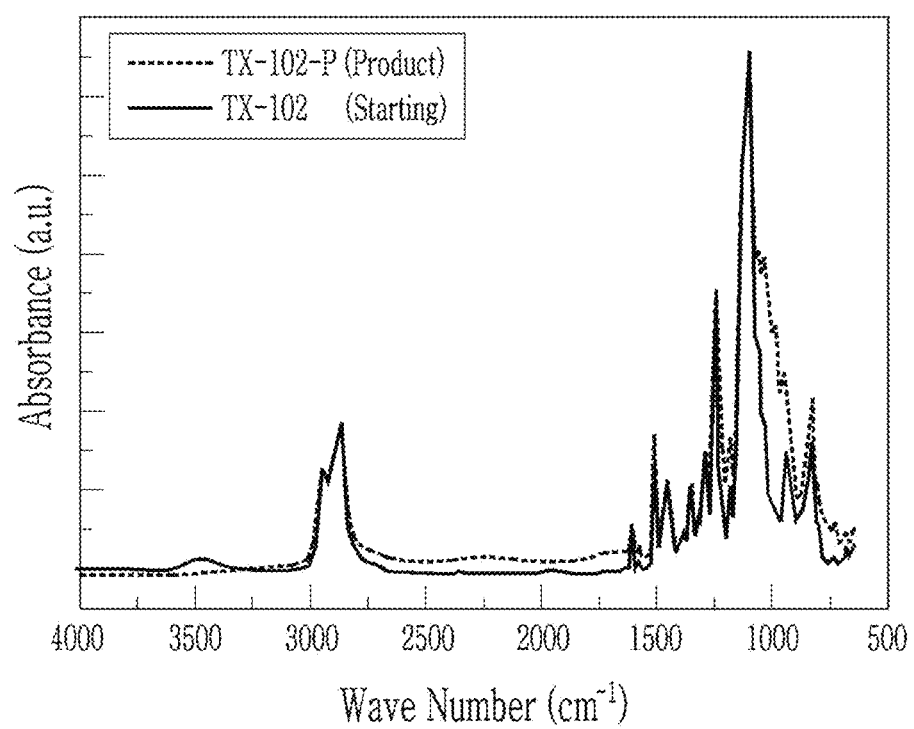
FIG. 10 is a FT-IR (Fourier Transform Infrared Spectroscopy) showing the compound represented by Chemical Formula 5 (TX102-P), prepared in Synthesis Example 1, along with the starting material thereof, Triton X-102 FIG. 11 an NMR spectroscopy of the compound represented by Chemical Formula 5 (TX102-P), prepared in Synthesis Example 1.
Figure 11:
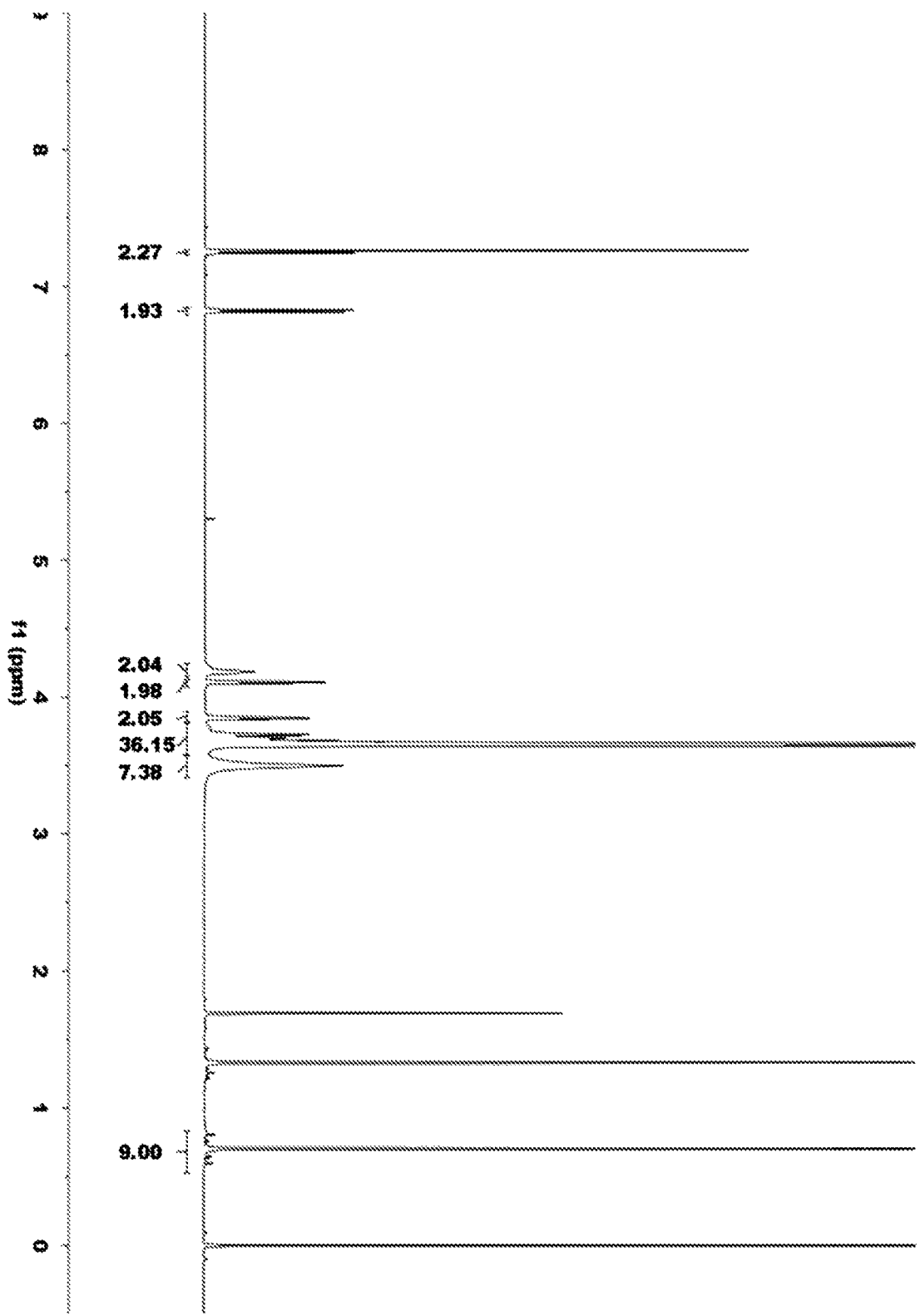

As shown in Reaction Scheme 1 below, a compound represented by Triton X-102 (Sigma-Aldrich Corp., hereinafter, referred to as "TX-102") 22 grams (g) (3 moles) and diphosphorous pentoxide ($P_2O_5^-$: Aldrich Com. Ltd.) 2.9 g (20 mmols) are put into a dry 25 milliliter round bottomed flask, and stirred in a nitrogen atmosphere for 24 hours while maintaining the temperature at 100° C. After completion of the reaction, a mixture of DCM (dichloromethane) and 15% aqueous solution of HCl in a volumetric ratio of 5:3 is added to the flask, stirred for 24 h, and the DCM layer was evaporated. Then, the evaporated compound was analyzed using FT-IR (Fourier Transform-Infrared) and NMR (Nuclear Magnetic Resonance) spectroscopy to identify the structure. From the analysis, a phosphate head group and a linking group between the head group and an oxygen of an ethylene glycol group was present, which were not present in the starting material, Triton X-102. Accordingly, the phosphate compound represented by Chemical Formula 5 (hereinafter, referred to as "Triton X-102-P") was confirmed as the product (FIG. 10 and FIG. 11):

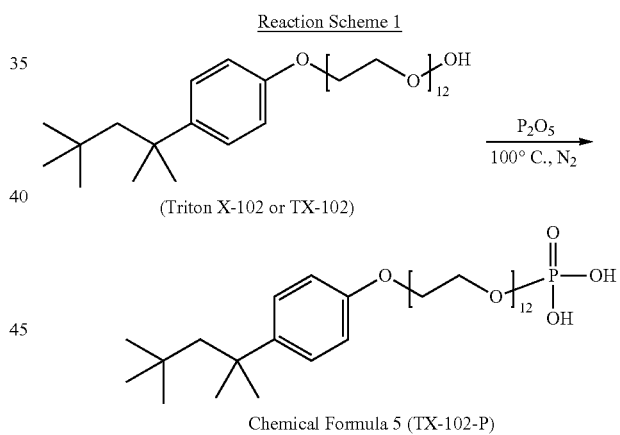

Figure 5:
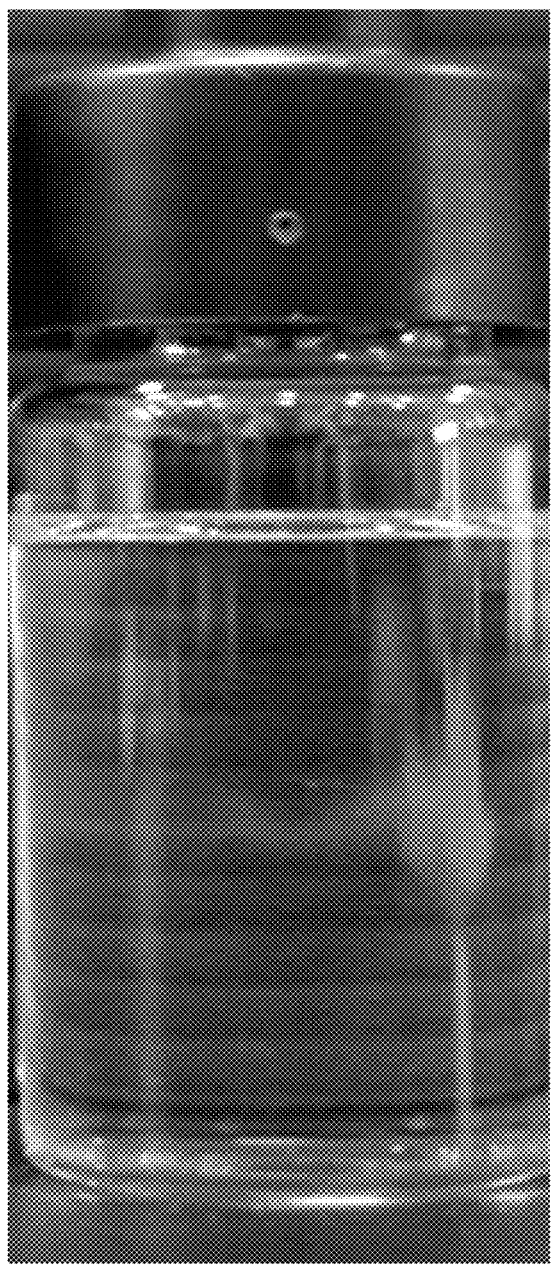
FIG. 5 is a photograph showing a dispersion including titania nanorods in toluene, wherein a surface of the titania nanorods is treated with oleic acid.
Figure 6:
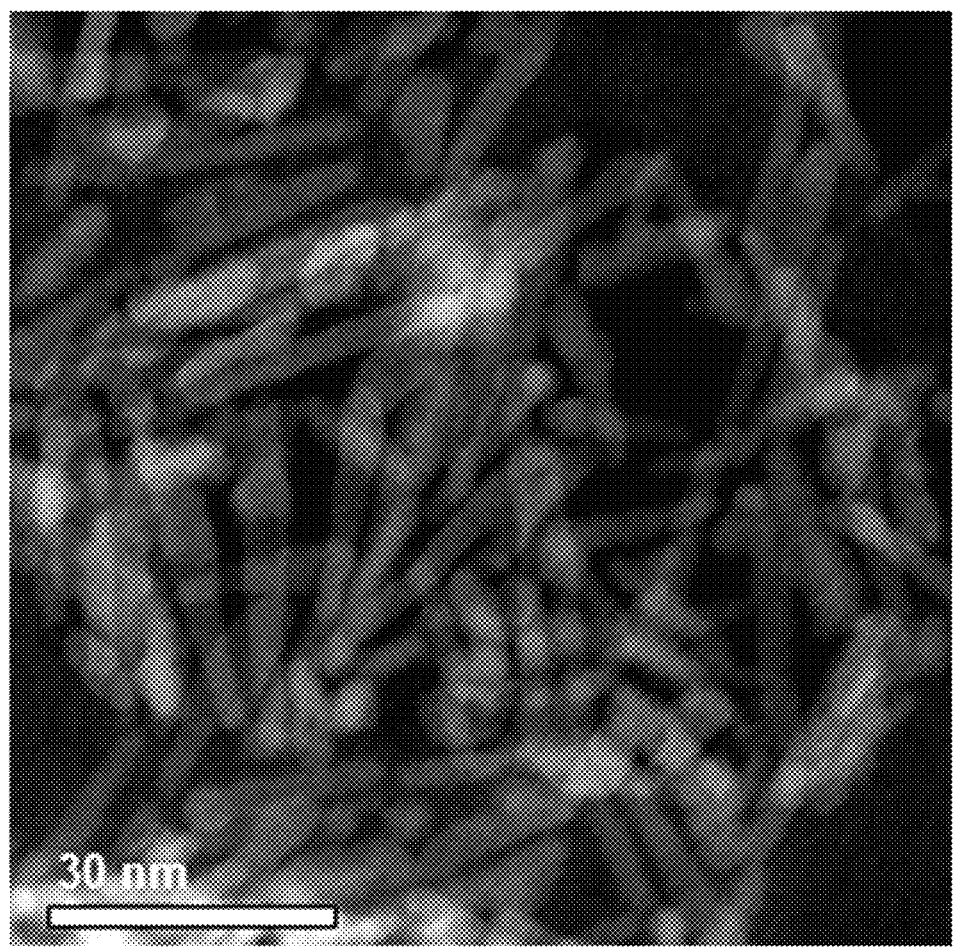
FIG. 6 is a TEM photograph showing the titania nanorods in the dispersion shown in FIG. 5.

Synthesis Example 2: Synthesis of Titania Nanorod 1 mole of titanium isopropoxide is added to 38 milliliters (ml) of isopropyl alcohol including 5 moles of oleic acid, and the mixture is stirred for 2 hours. Subsequently, the solution is heated at 180° C. for 4 hours using a microwave (MAR6, CEM Corp.) to obtain a $TiO_2$ nanorod capped with oleic acid. The obtained $TiO_2$ nanorod solution is separated from the mixture using a centrifuge at 5000 rpm for 30 minutes (SORVALL X1R, Thermo Fisher Scientific Inc.), and the bottom solution layer therefrom is washed with toluene to obtain transparent oleic acid-capped $TiO_2$ nanorod uniformly dispersed in toluene. It is confirmed that the obtained $TiO_2$ is relatively uniformly dispersed in the toluene solution upon visual inspection by the naked eye (FIG. 5) and a TEM photograph (FIG. 6).

Compound TX-102-P, represented by Chemical Formula 5, prepared in Synthesis Example 1, is added to the obtained oleic acid-capped TiO$_2$ nanorod dispersion, as lately described Examples and in Table 1 below, in an amount of from 75 weight by parts to 400 weight by parts based on 100 weight by parts of the TiO$_2$ nanorod, respectively, and reacted at room temperature for 48 hours. By the above reaction, oleic acid capping the surface of the titania nanorod is replaced by the compound, TX-102-P, represented by Chemical Formula 5, which is filtered and dispersed in acetone solvent to obtain TiO$_2$ nanorod treated with the compound represented by Chemical Formula 5.

Figure 7:
FIG. 7 is a photograph showing a dispersion including titania nanorods in an MIBK solvent, wherein a surface of the titania particles is treated with the compound represented by Chemical Formula 5 (TX102-P) prepared in Synthesis Example 1.
Figure 8:
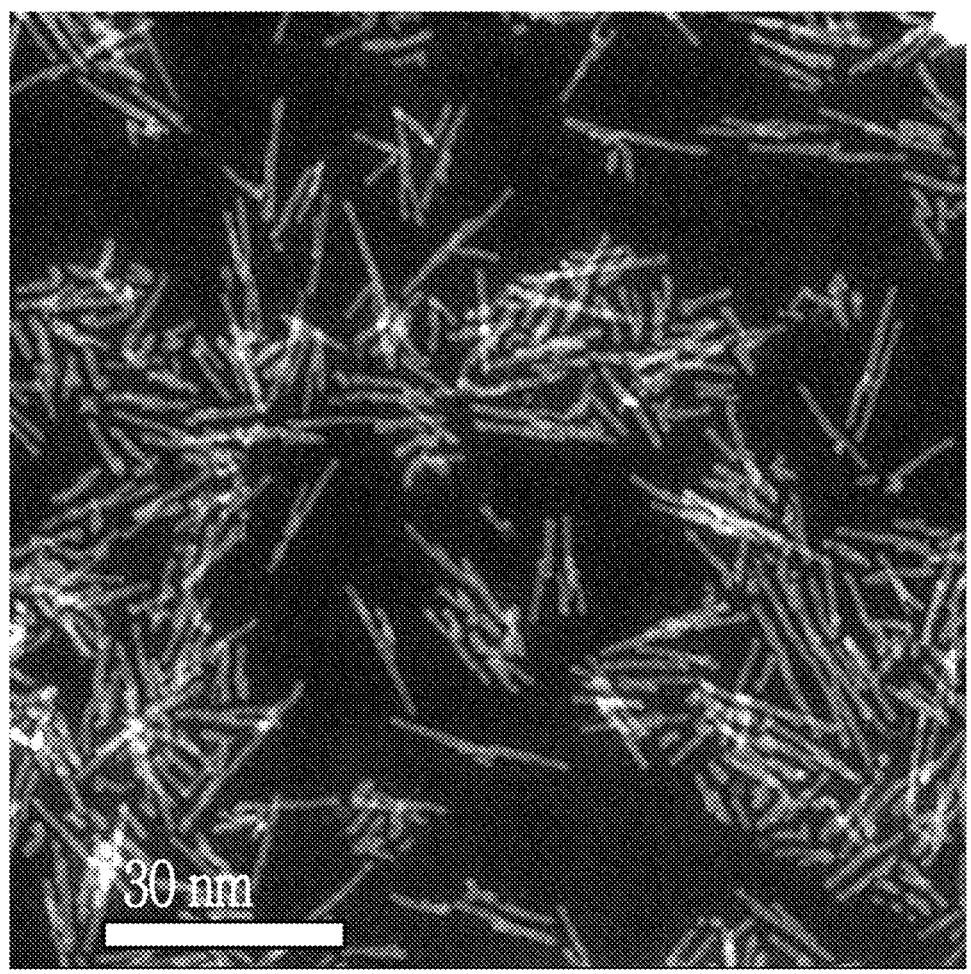
FIG. 8 is a TEM photograph showing the titania nanorods in the dispersion shown in FIG. 7.
Figure 9:
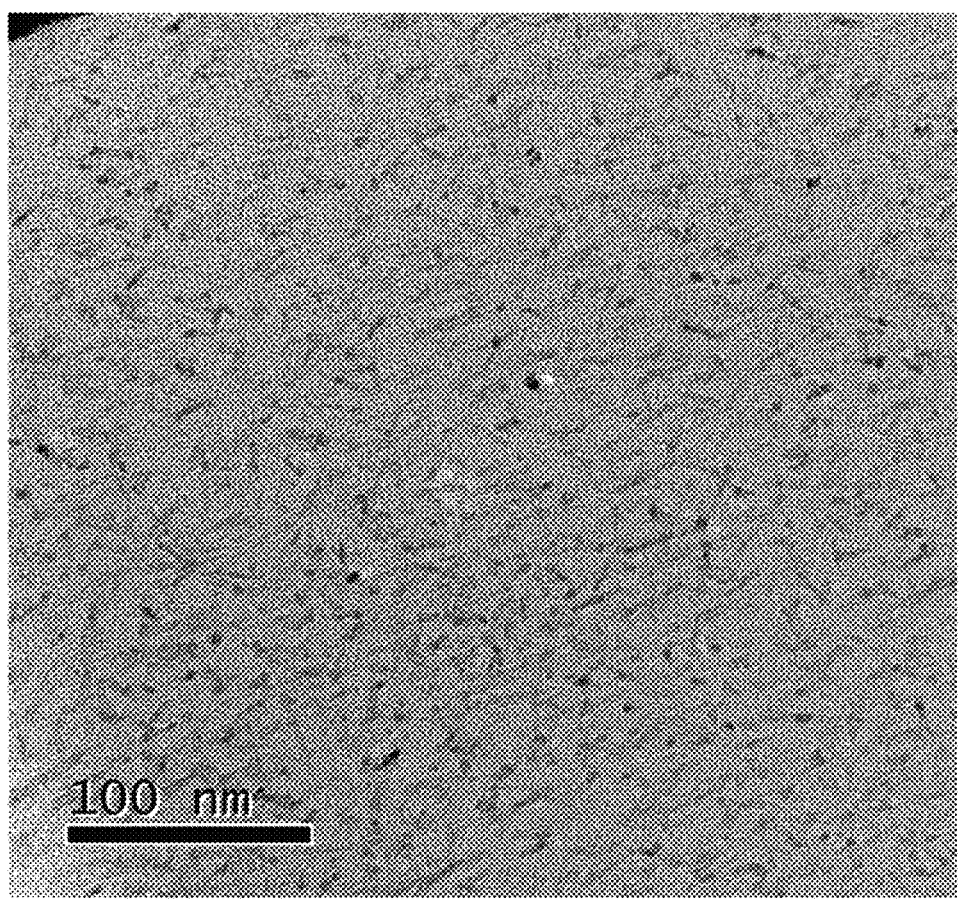
FIG. 9 is a TEM photograph showing the dispersion shown in FIG. 7.

A dispersion including the TiO$_2$ nanorod treated with the compound represented by Chemical Formula 5 in MIBK (methyl isobutyl ketone) appears transparent (FIG. 7), and TEM images (FIGS. 8 and 9) show that the titania nanorods treated with the compound represented by Chemical Formula 5 are uniformly dispersed in the dispersion. The obtained titania nanorod has an average diameter of the longest diameter of 20 nm.

Meanwhile, titania nanorod having an average diameter of the longest diameter of 33 nm is obtained by using the same method as above, except for using 38 mL of isopropyl alcohol including 7 moles of oleic acid, instead of 5 moles of oleic acid. That is, by controlling the amount or ratio of the reactants, the length of the titania nanorod can be controlled.

Synthesis Example 3: Synthesis of Polyimide Solution 4.8034 g (0.015 mol) of TFDB is dissolved in 40 ml of DMAc at 25° C. under a nitrogen atmosphere in a 250 ml double wall reactor equipped with a mechanical agitator and a nitrogen inlet. Subsequently, 5.3309 g (0.012 mol) of 6FDA, 0.8827 g (0.003 mol) of BPDA, and 14 ml of DMAc are added to the solution and reacted therewith at 25° C. for 24 hours to obtain a polyamic acid solution (a solid content of 18 wt %). Then, 4.3 ml (0.045 mol) of acetic anhydride and 3.6 ml (0.045 mol) of pyridine are slowly added to the polyamic acid solution, and the mixture is stirred at 25° C. for 15 hours to complete a chemical imidization. The obtained polyimide is precipitated in distilled water, ground with a blender, and washed with ethanol. A white precipitate therefrom is filtered and vacuum-dried overnight at 70° C. The obtained polyimide is dissolved in MIBK to prepare an 18 wt % solution.

Examples 1 to 10: Preparation of Polyimide-Titania Nanocomposite Solutions

Polyimide-titania nanocomposite solutions are prepared by adding the titania nanorod treated with TX-102-P, the compound represented by Chemical Formula 5, prepared in Synthesis Example 2, to the polyimide solution prepared in Synthesis Example 3, and mixed. Specifically, each polymer-inorganic particle nanocomposite solution according to Examples 1 to 10 is prepared by respectively adding different amount of the titania nanorod according to Synthesis Example 2, i.e., from 19 parts by weight to 40 parts by weight as described in Table 1 below, to the polyimide solution according to Synthesis Example 3, based on 100 parts by weight of polyimide (solid content), and then, stirring each mixture including the polyimide and the titania nanorod at room temperature for 2 hours. All of the prepared polyimide-titania nanocomposite solutions are visually transparent.

Comparative Example 1: Preparation of Polyimide-Titania Nanocomposite Solution A polyimide-titania nanocomposite solution according to Comparative Example 1 is prepared by adding 15 parts by weight of the titania nanorods coated with oleic acid, instead of the titania nanorod treated with the compound represented by Chemical Formula 5, to the polyimide solution of Synthesis Example 3 based on 100 parts by weight of the polyimide (solid content). The solution according to Comparative Example 1 is stirred for the same time as in Examples 1 to 10, but the resultant solution is not transparent but opaque.

Comparative Examples 2 and 3: Preparation of Polyimide-Titania Nanocomposite Solution A polyimide-titania nanocomposite solution according to Comparative Examples 2 and 3 are prepared by adding 26 parts by weight and 35 parts by weight of titania nanorod treated with the silane compound (Gelest, Inc.) represented by Chemical Formula 6, respectively, instead of titania nanorod treated with the compound represented by Chemical Formula 5, to the polyimide solution prepared in Synthesis Example 3 based on 100 parts by weight of the polyimide (solid content):

Chemical Formula 6

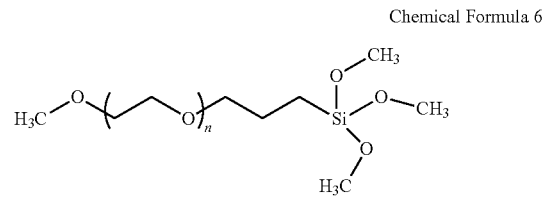

In Chemical Formula 6, n is an integer ranging from 9 to 12.

Figure 12:
FIG. 12 is a photograph showing a dispersion including titania nanorods treated with a silane compound, prepared in Comparative Examples 2 and 3, in an MIBK solvent.
Figure 13:
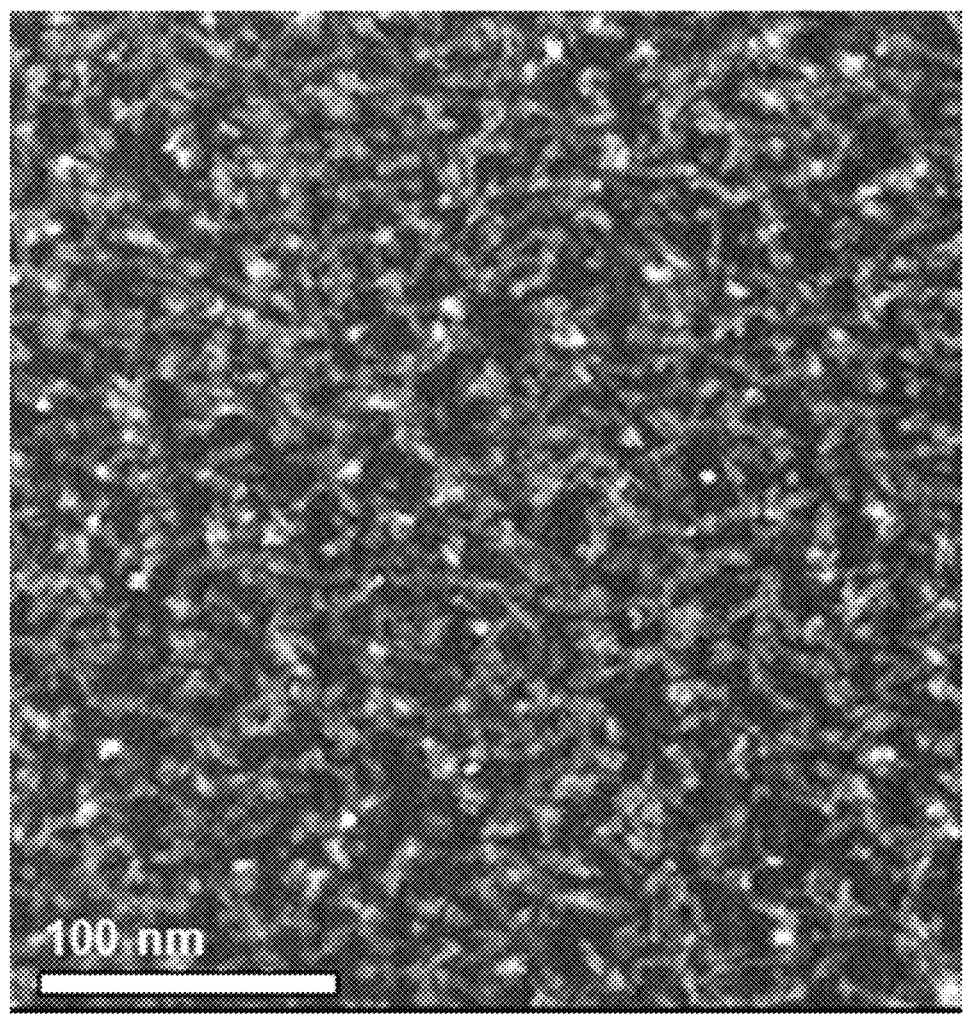
FIG. 13 is a TEM photograph showing the dispersion shown in FIG. 12.
Figure 14:
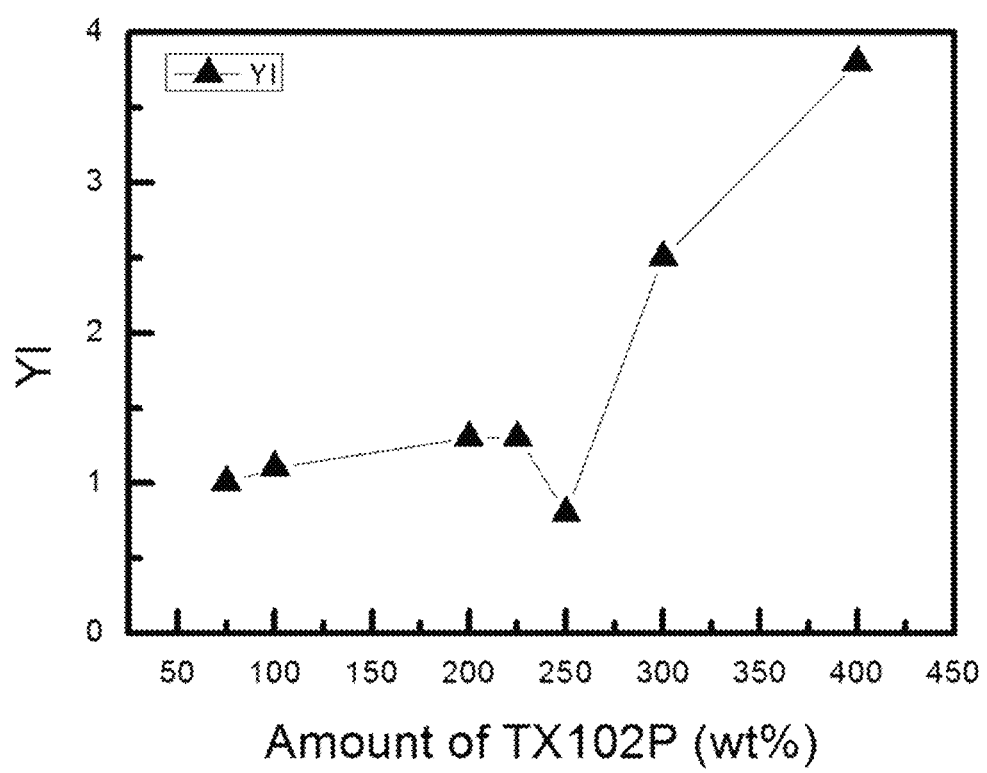
FIG. 14 is a graph showing YI (Yellowness Index) versus amount of the compound represented by Chemical Formula 5 (TX102-P) of polyimide-titania composite films, wherein a surface of the titania is treated with the compound (TX102-P).
Figure 15:
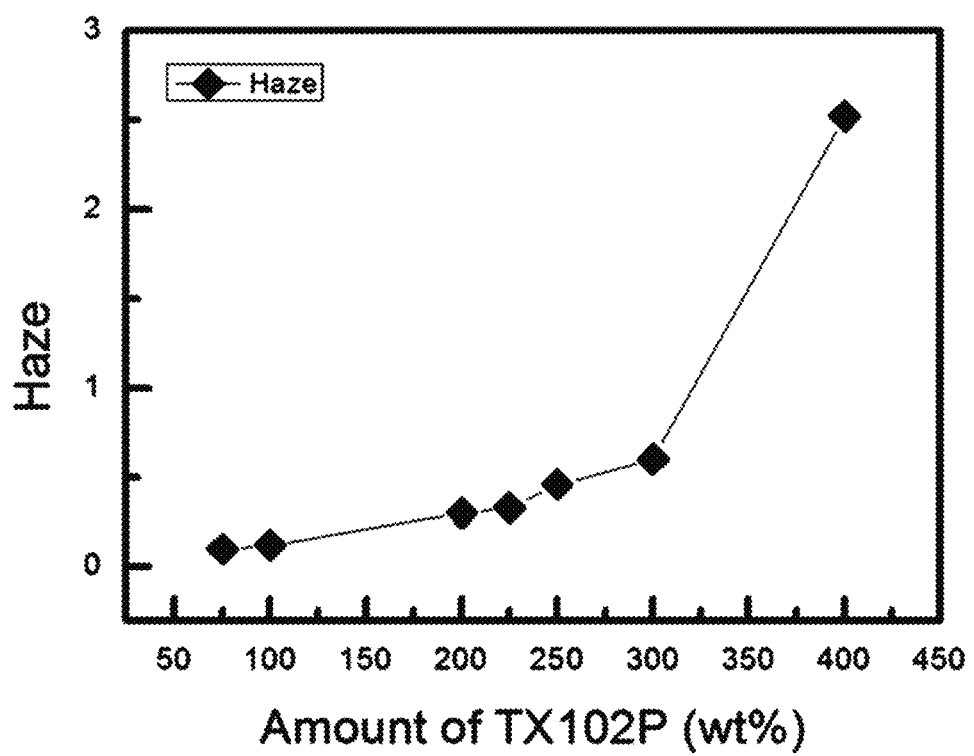
FIG. 15 is a graph showing haze versus amount of the compound represented by Chemical Formula 5 (TX102-P) of polyimide-titania composite films, wherein a surface of the titania is treated with the compound (TX102-P).
Figure 16:
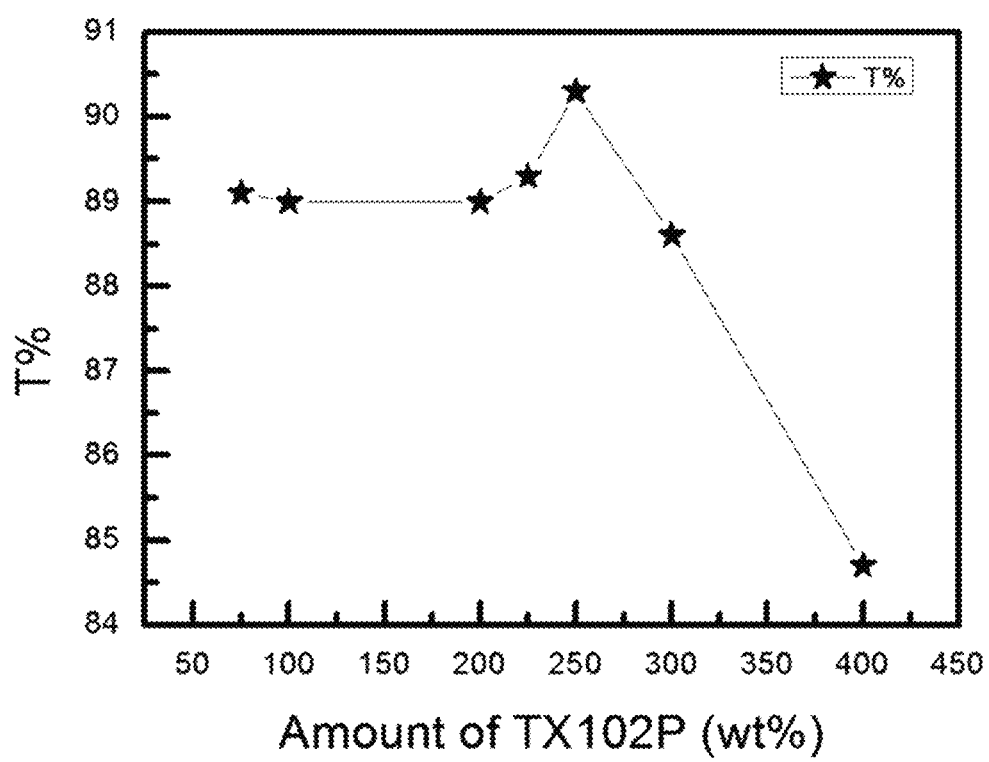
FIG. 16 is a graph showing transmittance in a wavelength region of from 360 nm to 700 nm versus amount of the compound represented by Chemical Formula 5 (TX102-P) of polyimide-titania composite film, wherein a surface of the titania is treated with the compound (TX102-P).
Figure 17:
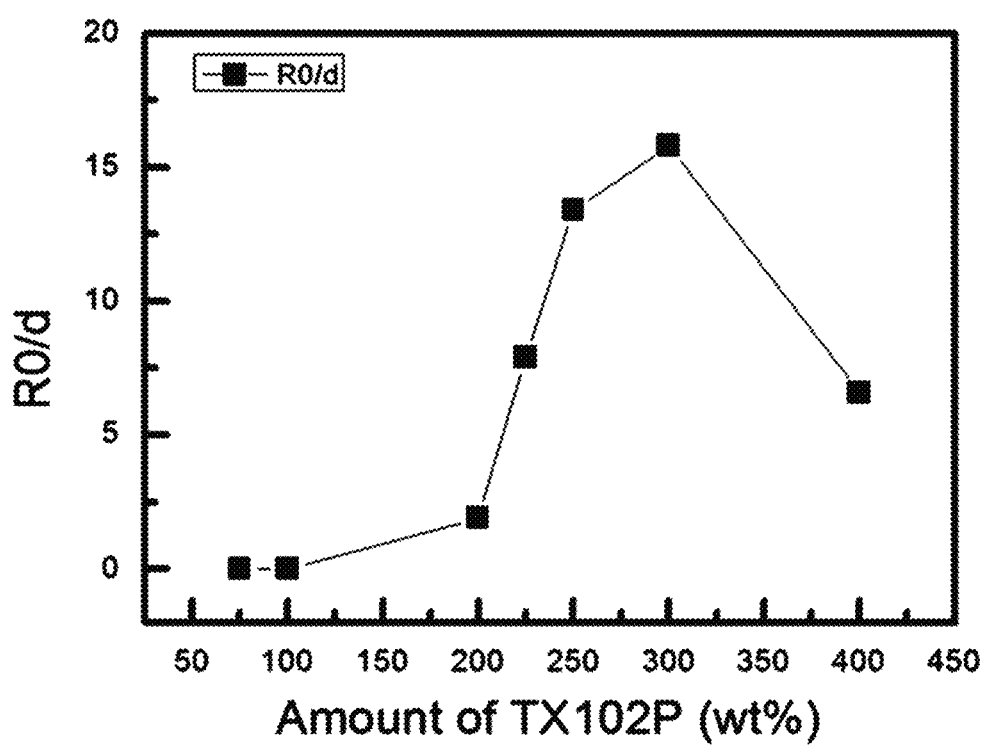
FIG. 17 is a graph showing in-plane retardation ($R_o$) versus amount of the compound represented by Chemical Formula 5 (TX102-P) of polyimide-titania composite film, wherein a surface of the titania is treated with the compound (TX102-P).
Figure 18:
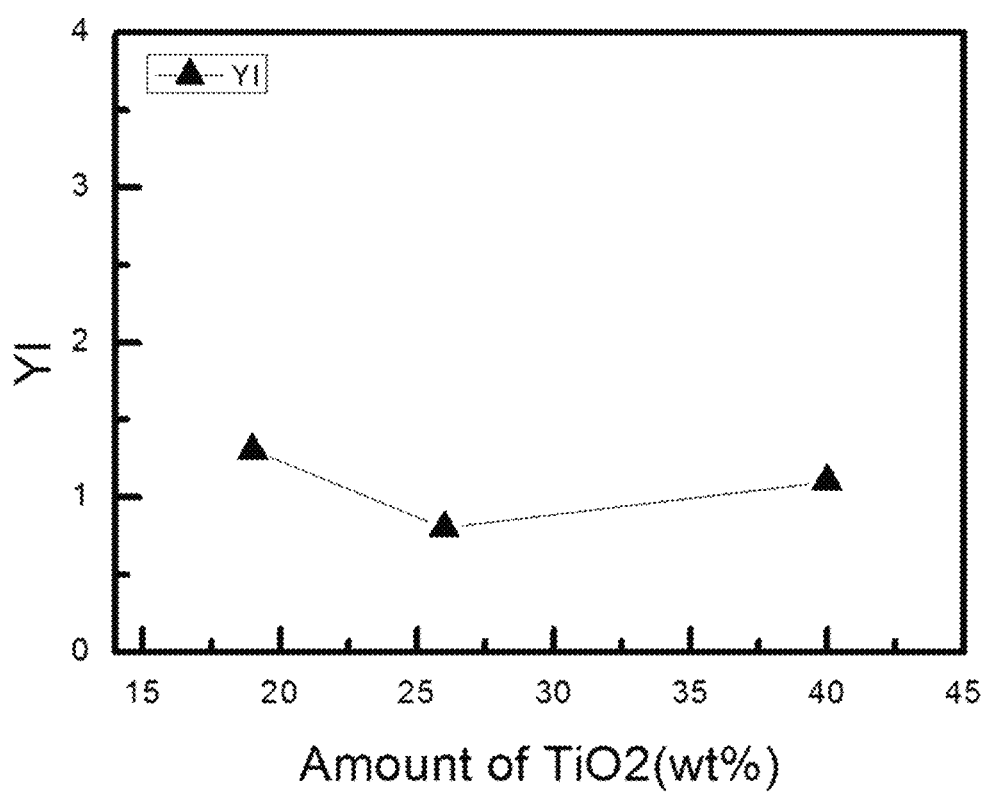
FIG. 18 is a graph showing YI versus amount of the titania nanorod treated with the compound represented by Chemical Formula 5 (TX102-P) of polyimide-titania nanorod composite film, wherein a surface of the titania nanorod is treated with the compound (TX102-P).
Figure 19:
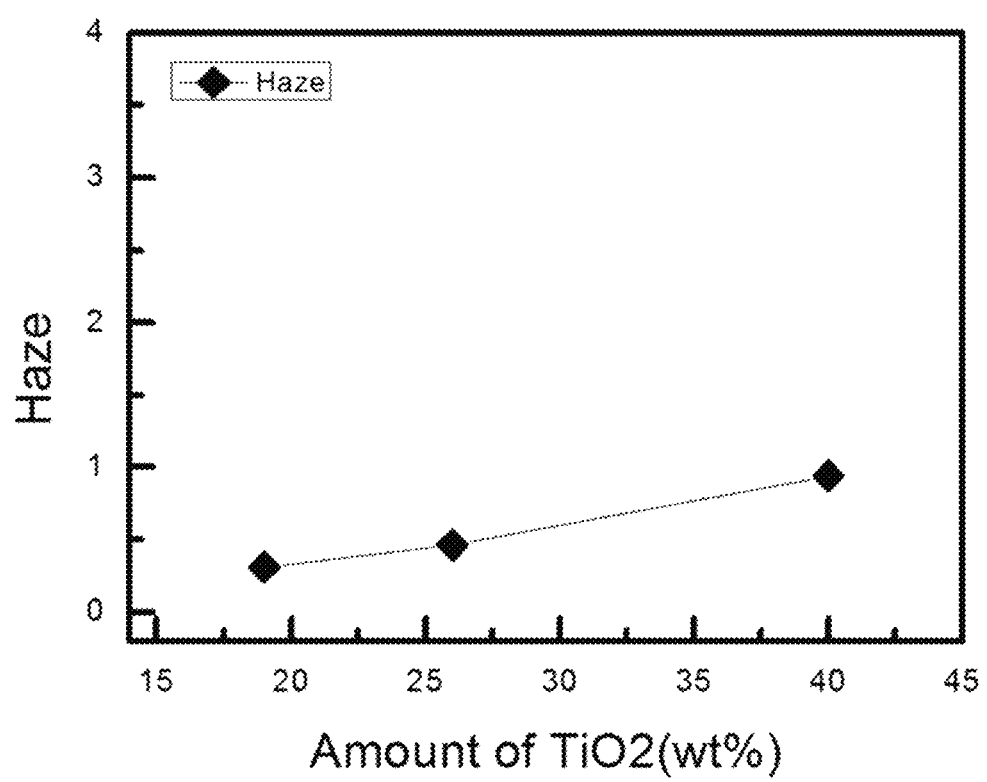
FIG. 19 is a graph showing haze versus amount of the titania nanorods treated with the compound represented by Chemical Formula 5 (TX102-P) of the polyimide-titania nanorod composite films, wherein a surface of the titania nanorod is treated with the compound (TX102-P).
Figure 20:
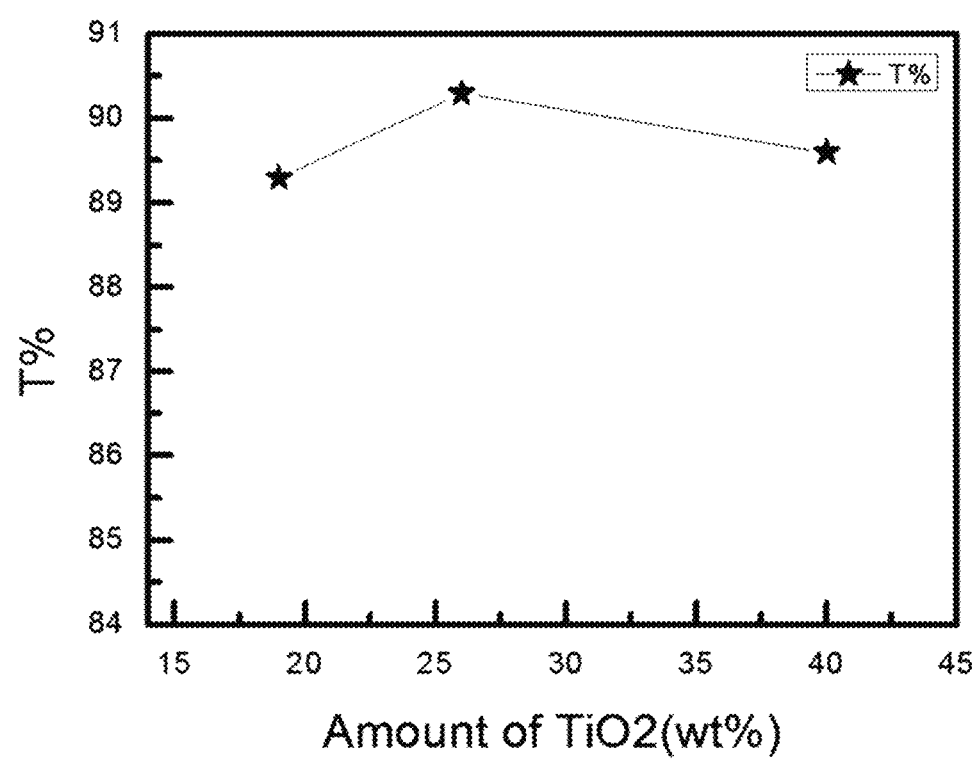
FIG. 20 is a graph showing transmittance in a wavelength region of from 360 nm to 700 nm versus amount of the titania nanorods treated with the compound represented by Chemical Formula 5 (TX102-P) of polyimide-titania nanorod composite film, wherein a surface of the titania nanorod is treated with the compound (TX102-P).
Figure 21:
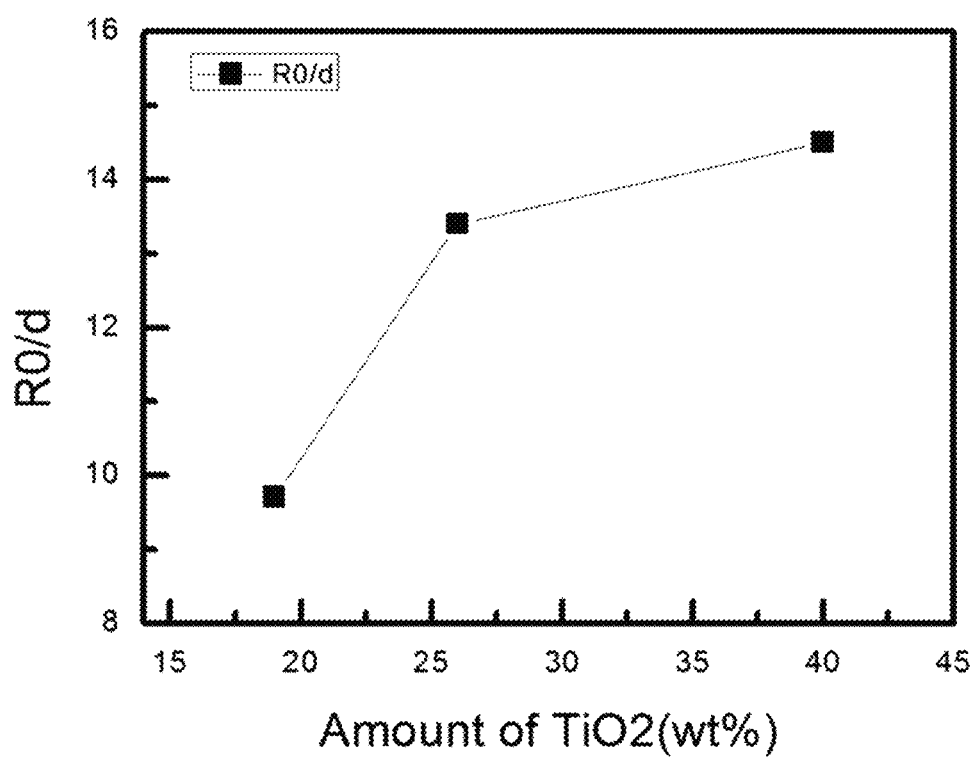
FIG. 21 is a graph showing in-plane retardation ($R_o$) versus amount of the titania nanorod treated with the compound represented by Chemical Formula 5 (TX102-P) of polyimide-titania nanorod composite film, wherein a surface of the titania nanorod is treated with the compound (TX102-P).

The titania nanorod treated with the compound represented by Chemical Formula 6 is prepared by adding the compound represented by Chemical Formula 6, instead of the compound represented by Chemical Formula 5 prepared in Synthesis Example 1, to the dispersion including TiO$_2$ nanorods capped with oleic acid as prepared in Synthesis Example 2, and the resulting mixture is reacted for 48 hours at room temperature for the oleic acid adsorbed to the surface of the TiO$_2$ nanorods to be replaced with the silane compound represented by Chemical Formula 6. The titania nanorods substituted with the silane compound is filtered and dispersed in acetone solvent, and is re-dispersed in MIBK (methyl isobutyl ketone) to prepare a dispersion. This prepared dispersion also appears transparent (FIG. 12) as those of Examples 1 to 10. Further, a TEM photograph thereof (FIG. 13) also shows that the titania nanorods treated with the silane compound represented by Chemical Formula 6 are uniformly dispersed in the polymer solution.

Film Manufacture and Evaluation

The polyimide-titania composite solutions according to Examples 1 to 10 and the polyimide-titania composite solution according to Comparative Examples 1 to 3 are respectively coated on a glass substrate, and a solvent is removed therefrom to obtain each film. Specifically, the nanocomposite solutions according to Examples 1 to 10 and Comparative Examples 1 to 3 are respectively dropped on a glass substrate (5×5 cm) and spin-coated at a rotation speed of 600 to 3,000 rpm. The spin-coated samples are respectively pre-dried at 80° C. on a hot plate for 30 minutes to evaporate an excessive amount of the solvent. Subsequently, the samples are heated up to 200° C. under a nitrogen atmosphere at a heating rate of 10° C./min, and then, maintained at 200° C. and dried for 1 hour to obtain each film according to the Examples and Comparative Example. In addition, a film of a control group is prepared by not including inorganic particles at all but including only the polyimide solution of Synthesis Example 3.

For the films prepared and having identical thicknesses, length (an average diameter of the longest diameter) and content of the titania nanorod included in the films, content of the compound, TX-102-P, represented by Chemical Formula 5, optical properties of the films, such as, yellowness index (YI), haze (%), and transmittance (%) at a total wavelength region (total transmittance), and in-plane retardation ($R_o$) and out-of-plane birefringence ($R_{th}$) of the films are described in Table 1 below. In Table 1, both the compounds represented by Chemical Formula 5 and Chemical Formula 6 are referred to as "dispersant".

The thickness of each film is measured by using Micrometer (Mitutoyo Com. Ltd.).

Optical properties (transmittance, yellowness index, and haze) of each film are measured by using a spectrophotometer, "Konica Minolta CM3600d," in a transmittance opacity/haze mode. An average transmittance at total wavelength range is measured in a wavelength range of 360 nm to 700 nm.

In-plane retardation ($R_o$) and out-of-plane retardation ($R_{th}$) of each film are measured by using Axoscan (Axometrics, Inc) in a wavelength region from 400 nm to 700 nm, while controlling an interval as 5 degrees between −40° to 40° smallest, i.e., a refractive index at the fast axis, and '$n_z$' is the in-plane refractive index perpendicular to the $n_x$, and 'd' is the thickness of the film.

As shown from Table 1, the films formed from respectively the polyimide-titania composite solutions according to Examples 1 to 7 and 10 including from 75 parts by weight to less than 300 parts by weight of the phosphate compound, TX-102-P, represented by Chemical Formula 5 and prepared in Synthesis Example 1, along with titania nanorod in an amount of from 19 parts by weight to 40 parts by weight based on 100 parts by weight of solid content of polyimide show similar optical properties, such as, YI, haze, and total transmittance, to those of the film according to the Control film that includes only polyimide but no titania nanorod. That is, including a large quantity of inorganic particles relative to the amount of polymer, does not significantly deteriorate the optical properties of the film prepared therefrom are. On the contrary, the films formed of the polyimide-titania composite solutions according to Examples 8 and 9 including 300 parts by weight and 400 parts by weight of the phosphate compound, TX-102-P, represented by Chemical Formula 5, respectively, based on 100 parts by weight of $TiO_2$, along with titania nanorod in an amount of 26 parts by weight based on 100 parts by weight of solid content of polyimide show a little deterioration of the optical properties, such as, increased YI, which is greater than 2, and a slightly reduced total wavelength transmittance, as compared to the control film. As such, it is confirmed that the optical properties of a film may depend on the amount of the compound represented by Chemical Formula 5. Accordingly, when fixing the amount of titania nanoparticles to 26 parts by weight based on 100 parts by weight of solid content of polyimide and increasing the amount of the

TABLE 1

| | Length of $TiO_2$ (nm) | Content of $TiO_2$ (parts by weight) | Content of dispersant (parts by weight) | $R_o$*/d | $R_{th}$**/d | YI (D1925) | haze (%) | transmittance (%) |
|---|---|---|---|---|---|---|---|---|
| Control | 0 | 0 | 0 | 0 | 59.8 | 0.7 | 0.12 | 90.8 |
| Example 1 | 20 | 26 | 75 | 0 | 27.78 | 1.0 | 0.10 | 89.1 |
| Example 2 | 20 | 26 | 100 | 0 | 26.27 | 1.1 | 0.12 | 89.0 |
| Example 3 | 20 | 26 | 200 | 1.9 | 15.11 | 1.3 | 0.30 | 89.0 |
| Example 4 | 20 | 26 | 225 | 7.9 | 13.98 | 1.3 | 0.33 | 89.3 |
| Example 5 | 20 | 19 | 250 | 9.7 | 13.77 | 1.3 | 0.31 | 89.3 |
| Example 6 | 20 | 26 | 250 | 13.4 | 7.75 | 0.8 | 0.46 | 90.3 |
| Example 7 | 20 | 40 | 250 | 14.5 | 5.93 | 1.1 | 0.94 | 89.6 |
| Example 8 | 20 | 26 | 300 | 15.8 | 5.74 | 2.5 | 0.60 | 88.6 |
| Example 9 | 20 | 26 | 400 | 6.6 | 5.02 | 3.8 | 2.52 | 84.7 |
| Example 10 | 33 | 26 | 250 | 20.2 | 4.73 | 1.3 | 0.32 | 89.5 |
| Comparative Example 1 | 20 | 15 | — | — | — | 9.1 | 85.5 | 79.3 |
| Comparative Example 2 | 20 | 26 | 250 | 0 | 18.2 | 1.9 | 0.5 | 89.8 |
| Comparative Example 3 | 20 | 35 | 250 | 0 | 11.3 | 2.8 | 0.6 | 89.7 |

In Table 1, content of $TiO_2$ indicates parts by weight of $TiO_2$ based on 100 parts by weight of solid content of polyimide. Further, the content of the dispersant, which is the compound represented by Chemical Formula 5 or the compound represented by Chemical Formula 6, indicates parts by weight of the dispersant based on 100 parts by weight of $TiO_2$.

In Table 1, $R_o$*=$(n_x-n_y) \times d$, and $R_{th}$**={$(n_x+n_y)/2-n_z$}×d. In the formulae, '$n_x$' is the refractive index in a direction at which the in-plane refractive index is the largest, i.e., a refractive index at slow axis, and '$n_y$' is the refractive index in a direction at which the in-plane refractive index is the compound represented by Chemical Formula 5 from 75 parts by weight to 400 parts by weight based on 100 parts by weight of titania nanoparticles, the total transmittance, haze, YI, and in-plane retardation of the films formed therefrom are measured, and the results are shown in the graphs of FIGS. 14 to 17. As shown from FIGS. 14 to 17, as the amount of the dispersant represented by Chemical Formula 5 increases, total transmittance increases and in-plane retardation (Ro) also increases, while haze and YI tend to increase. Particularly, when the amount further increases exceeding 250 parts by weight to greater than or equal to 300 parts by weight, both the total transmittance and in-plane retardation ($R_o$) decrease, as well as haze and YI further increase to go beyond the range required in optical films.

Further, in order to examine the effect of the content of titania nanoparticles to the optical properties, when fixing the amount of the compound represented by Chemical Formula 5 to 250 parts by weight based on 100 parts by weight of $TiO_2$, and increasing the amount of titania nanoparticles from 19 parts by weight to 40 parts by weight based on 100 parts by weight of polyimide, the total transmittance, haze, YI, and in-plane retardation of the films formed therefrom are measured, and the results are shown in the graphs of FIGS. 18 to 21. As shown from FIGS. 18 to 21, as the content of titania nanoparticles increases to about 25 parts by weight, both total transmittance and in-plane retardation ($R_o$) increase, while haze consistently increases as the amount of the nanoparticles increases. As the amount of the nanoparticles increases exceeding 25 parts by weight to 40 parts by weight, both total transmittance and YI increase, while in-plane retardation ($R_o$) consistently increases but the speed of increasing becomes slow. Considering the tendencies of FIGS. 18 to 20, when the amount of the nanoparticles increases exceeding 40 parts by weight, it is expected that the total transmittance is further decreased, and haze and YI further increase.

Meanwhile, even though the amounts of the compound represented by Chemical Formula 5 and of the titania nanoparticles are the same as 250 parts by weight and 26 parts by weight, respectively, optical properties and in-plane retardation may vary depending on the length of titania nanorods. That is, while the amounts of the compound represented by Chemical Formula 5 and titania nanoparticles of Examples 6 and 10 are the same as each other, the lengths of titania nanorods are different from each other. The lengths of the titania nanorods is 20 nm for Example 6 and 33 nm for Example 10. In this case, optical properties of the film according to Example 6, wherein the length of titania nanorod is 20 nm, are slightly better than those of the film according to Example 10, wherein the length of titania nanorod is 33 nm, while in-plane retardation is larger in the film of Example 10 than the film of Example 6.

The film formed from the polyimide-titania composite solution according to Comparative Example 1, which includes titania nanorod (20 nm of length) capped with oleic acid in an amount of 15 parts by weight based on 100 parts by weight of polyimide, and not treated with any of the compound represented by Chemical Formula 5 or Chemical Formula 6, which is prepared as an intermediate in the process of preparing titania nanorod, shows remarkably deteriorated optical properties, such as, 9.1 of YI, 85.5 of haze, and 79.3% of total transmittance, compared with the control film that does not include titania nanoparticles. On the contrary, the films according to Comparative Examples 2 and 3, which includes titania nanorods treated with 250 parts by weight of silane compound represented by Chemical Formula 6, shows slightly increased YI, but maintains haze and total transmittance to the same degrees as in the films according to Examples 1 to 7 and 10. However, the films according to Comparative Examples 2 and 3 do not exhibit in-plane retardation.

In order to evaluate the heat-resistance of the films according to the Examples, a film having the same composition as that of Example 6, and having a thickness of 5.8 μm is fabricated, heat-treated in a furnace (oven) heated to 180° C. for 17 minutes in a nitrogen atmosphere, and then, optical properties, such as total transmittance, YI, and haze, after the heat-treatment are measured. The results are shown in Table 2, which shows that the optical properties are exactly the same as before and after the heat-treatment. That is, a polyimide-titania composite film according to an embodiment, formed from a composition including polyimide, large quantity of titania particles, along with a compound represented by Chemical Formula 5, has good heat-resistance.

TABLE 2

| Before heat-treatment | | | After heat-treatment | | |
|---|---|---|---|---|---|
| Total transmittance (%) | YI | Haze | Total transmittance (%) | YI | Haze |
| 89.9 | 1.2 | 0.5 | 89.9 | 1.2 | 0.5 |

From the descriptions, a film prepared from a polymer-inorganic particles composite that includes inorganic particles treated with a compound represented by Chemical Formula 5 has good mechanical characteristics and heat-resistance without deterioration of optical properties, as well as exhibits in-plane retardation ($R_o$), such that it may be advantageously applicable to compensation film, and the like.

Accordingly, a polymer-inorganic particle nanocomposite having remarkably improved mechanical properties and heat-resistance without deteriorating optical properties, as well as exhibiting optical anisotropy such as in-plane retardation, and an article formed therefrom may be provided according to an embodiment, and the composite and article are suitable for an optical device and the like requiring high transparency, excellent mechanical properties, and optical anisotropy.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A composition comprising
a polymer comprising an amic acid structural unit, an imide structural unit, or a combination thereof,
inorganic particles, and
a compound represented by Chemical Formula 1:

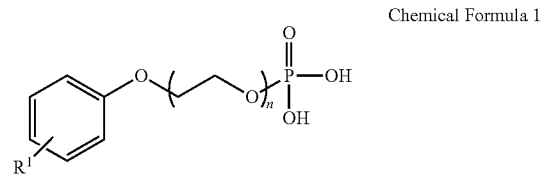

Chemical Formula 1 wherein, in Chemical Formula 1,
$R^1$ is a linear or branched, substituted or unsubstituted C1 to C30 alkyl group, a substituted or unsubstituted C3 to C10 cycloalkyl group, a substituted or unsubstituted C6 to C30 aryl group, or a combination thereof, and
n is an integer of 1 or more.

2. The composition of claim 1, wherein $R^1$ of Chemical Formula 1 is a linear or branched C1 to C20 alkyl group.

3. The composition of claim 1, wherein n of Chemical Formula 1 is an integer greater than or equal to 5 and less than or equal to 20.

4. The composition of claim 1, wherein the inorganic particle is an oxide, a hydroxide, a carboxylate, or a nitride of Ti, Si, Al, Zr, Zn, Sn, B, Ce, Sr, Ca, Ba, In, or W, a graphene oxide, or a combination thereof.

5. The composition of claim 1, wherein the inorganic particle is silica, alumina, titania, strontium titanate, zirconia, zinc oxide, indium tin oxide, strontium carbonate, zirconium tungsten oxide, antimony-doped tin oxide, graphene oxide, or a combination thereof.

6. The composition of claim 1, wherein the inorganic particles are titania nanorods.

7. The composition of claim 6, wherein the inorganic particles have an average particle diameter of a longest particle diameter of less than or equal to 50 nanometers.

8. The composition of claim 1, wherein the inorganic particles are present in the composition in an amount of less than or equal to 50 parts by weight based on 100 parts by weight of the polymer.

9. The composition of claim 1, wherein the compound represented by Chemical Formula 1 is present in the composition in an amount of less than 300 parts by weight based on 100 parts by weight of the inorganic particle.

10. The composition of claim 1, wherein the composition further comprises a solvent.

11. The composition of claim 1, wherein the amic acid structural unit is represented by Chemical Formula 2, and the imide structural unit is represented by Chemical Formula 3:

Chemical Formula 2

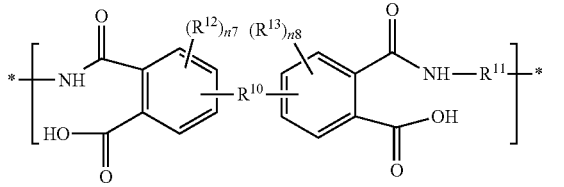

Chemical Formula 3

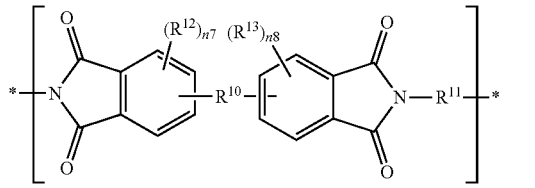

wherein, in Chemical Formula 2 and Chemical Formula 3, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C2 to C30 heterocyclic group, or a combination thereof, $R^{11}$ is a substituted or unsubstituted C4 to C20 aliphatic cyclic group, or a substituted or unsubstituted C6 to C30 aromatic organic group, wherein the substituted or unsubstituted aromatic organic group is a single ring; a fused ring comprising two or more aromatic rings; or a ring system comprising two or more substituted or unsubstituted single or fused aromatic rings linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein, $R^{201}$ is a C1 to C10 aliphatic organic group), or a —SiR$^{210}$R$^{211}$R$^{212}$ (wherein R$^{210}$, R$^{211}$ and R$^{212}$ are independently hydrogen or a C1 to C10 aliphatic organic group) group, and n7 and n8 are independently integers of 0 to 3.

12. The composition of claim 11, wherein in Chemical Formula 2 or Chemical Formula 3, $R^{10}$ is a single bond, or a substituted or unsubstituted C1 to C30 aliphatic organic group, $R^{11}$ is a substituted or unsubstituted C6 to C30 aromatic organic group, wherein the substituted or unsubstituted C6 to C30 aromatic organic group is a ring system comprising two or more single or fused aromatic rings linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 alkyl group, or a substituted or unsubstituted C6 to C20 aromatic organic group, and n7 and n8 are independently 0 or 1.

13. The composition of claim 11, wherein in Chemical Formula 2 or Chemical Formula 3, $R^{10}$ is a single bond, or a C1 to C10 alkylene group substituted with a haloalkyl group, $R^{11}$ is two substituted phenylene groups linked by a single bond, a fluorenylene group, a substituted or unsubstituted phenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C5 alkyl group, or a substituted or unsubstituted phenyl group, and n7 and n8 are independently 0 or 1.

14. The composition of claim 11, wherein Chemical Formula 2 is represented by Chemical Formula 2-1, Chemical Formula 2-2, or a combination thereof, and Chemical Formula 3 is represented by Chemical Formula 3-1, Chemical Formula 3-2, or a combination thereof:

Chemical Formula 2-1

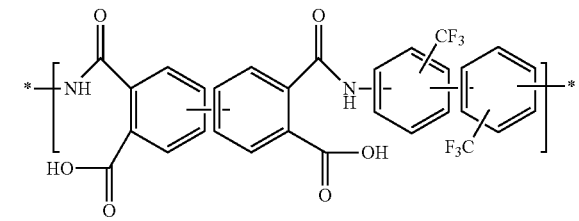

Chemical Formula 2-2

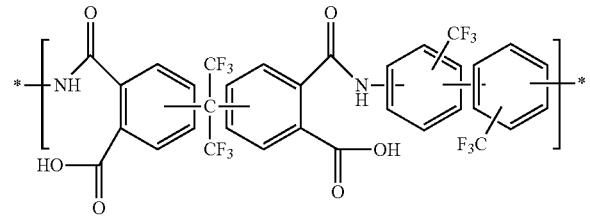

-continued

Chemical Formula 3-1

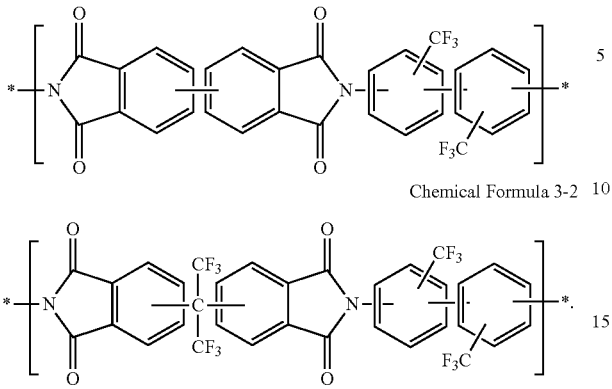

Chemical Formula 3-2

15. The composition of claim 11, wherein the polymer further comprises an amide structural unit represented by Chemical Formula 4:

Chemical Formula 4

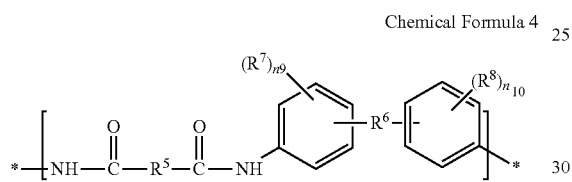

wherein, in Chemical Formula 4, $R^5$ is a substituted or unsubstituted C6 to C30 aromatic organic group, $R^6$ is a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^7$ and $R^8$ are independently a halogen, a hydroxy group, a substituted or unsubstituted C1 to C10 aliphatic organic group, C6 to C20 aromatic organic group, —OR$^{200}$ (wherein R$^{200}$ is a C1 to C10 aliphatic organic group), or a silyl group (—SiR$^{201}$R$^{202}$R$^{203}$, wherein R$^{201}$, R$^{202}$, and R$^{203}$ are independently hydrogen, a C1 to C10 aliphatic organic group), and n9 and n10 are independently integers of 0 to 4.

16. A polyimide-inorganic particle composite manufactured from the composition of claim 1.

17. An article comprising the polyimide-inorganic particle composite of claim 16.

18. The article of claim 17, wherein the article is a film.

19. An optical device comprising the article of claim 17.

* * * * *